(12) United States Patent  (10) Patent No.: US 8,223,464 B2
Yasui et al.  (45) Date of Patent: Jul. 17, 2012

(54) DIFFERENTIAL HEAD HAVING A BALANCED OUTPUT AND METHOD OF MANUFACTURING THEREOF

(75) Inventors: Kan Yasui, Kodaira (JP); Masato Shiimoto, Kanagawa (JP); Takeshi Nakagawa, Kanagawa (JP); Hiroyuki Katada, Kanagawa (JP); Nobuo Yoshida, Kanagawa (JP); Hiroyuki Hoshiya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 264 days.

(21) Appl. No.: 12/615,221

(22) Filed: Nov. 9, 2009

(65) Prior Publication Data

US 2010/0118448 A1 May 13, 2010

(30) Foreign Application Priority Data

Nov. 10, 2008 (JP) ................. 2008-287395

(51) Int. Cl.
*G11B 5/33* (2006.01)
*G11B 5/127* (2006.01)
(52) U.S. Cl. .............................. 360/324.12
(58) Field of Classification Search ............... 360/314, 360/317, 324.1, 324.11, 324.12, 324.2
See application file for complete search history.

(56) References Cited

U.S. PATENT DOCUMENTS

| 5,751,521 | A | * | 5/1998 | Gill ............................ 360/314 |
| 5,892,641 | A | * | 4/1999 | Ishiwata .................... 360/327.1 |
| 6,259,586 | B1 | * | 7/2001 | Gill ............................ 360/324.2 |
| 6,480,365 | B1 | * | 11/2002 | Gill et al. ................. 360/324.11 |
| 6,657,823 | B2 | | 12/2003 | Kawato ....................... 360/314 |
| 7,116,530 | B2 | * | 10/2006 | Gill ............................ 360/324.1 |
| 7,130,167 | B2 | * | 10/2006 | Gill ............................ 360/324.12 |
| 7,242,556 | B2 | * | 7/2007 | Gill ............................ 360/324.12 |
| 7,323,112 | B2 | * | 1/2008 | Baer et al. ..................... 216/22 |
| 7,508,613 | B2 | * | 3/2009 | Lee et al. ....................... 360/67 |
| 7,646,570 | B2 | * | 1/2010 | Gill et al. ................... 360/324.2 |
| 2006/0126228 | A1 | * | 6/2006 | Yoshikawa et al. ......... 360/315 |

* cited by examiner

*Primary Examiner* — Angel A. Castro
(74) *Attorney, Agent, or Firm* — Zilka-Kotab, PC

(57) ABSTRACT

In one embodiment, a differential-type magnetic read head includes a differential-type magneto-resistive-effect film formed on a substrate, and a pair of electrodes for applying current in a direction perpendicular to a film plane of the film. The film includes a first and second stacked film, each having a pinned layer, an intermediate layer, and a free layer, with the second stacked film being formed on the first stacked film. A side face in a track width direction of the film is shaped to have an inflection point at an intermediate position in a thickness direction of the film, and the side face is shaped to be approximately vertical to the substrate in an upward direction of the substrate from the inflection point. Also, the side face is shaped to be gradually increased in track width as approaching the substrate in a downward direction of the substrate from the inflection point.

13 Claims, 16 Drawing Sheets

(a) (b)

(a)

(b)

(a)

(b)

(a)

(b)

(a)

(b)

(a)

(b)

(a)

(b)

DIFFERENTIAL HEAD HAVING A BALANCED OUTPUT AND METHOD OF MANUFACTURING THEREOF

RELATED APPLICATIONS

The present application claims priority to a Japanese Patent Application filed Nov. 10, 2008, under Appl. No. 2008-287395, which is incorporated herein by reference.

FIELD OF THE INVENTION

The present invention relates to magnetic recording/reproducing devices, and specifically to a differential-type magneto-resistive-effect element that is used as a sensor for a magnetic read head mounted on a magnetic recording/reproducing device.

BACKGROUND OF THE INVENTION

In storage (recording) devices used for data and information systems, semiconductor memories and magnetic memories are generally used for data storage. For applications specifying short access times, semiconductor memories are generally used in internal storage devices. For applications specifying huge capacity and non-volatility, hard disk drives (HDDs) are generally used which employ magnetic disks as external storage devices. Storage capacity is an important index to indicate the capability of magnetic disk devices. Magnetic disk devices with huge capacity and having compact size have been increasingly requested by the market with recent developments of the information age.

The volume of information processing in the information age is increasing rapidly. In particular, HDDs, which are external storage devices, have been desired to store more information in its limited area and volume. A technical approach to this desire is to increase the capacity by increasing the recording density of the HDD. To achieve higher recording density, further miniaturization of recording bits is effective. Hence, in this approach, the size of a particle which is the unit of recording in a medium has been reduced.

The size of magnetic heads have been progressively reduced year after year in order to increase the recording density of a HDD using such heads. While an induction-type head combining a write head with a read head was mainly used in the past, a write/read, separated type head is currently being used generally for improving the performance of the HDD. While a write head is an induction head that writes information by using an induction magnetic field generated by a coil, a GMR (Giant Magneto-Resistance) head or TMR (Tunneling Magneto-Resistance) head using a spin valve as a magnetic sensor is used for a read head. FIG. 2 shows a schematic view of a write/read separated type head having a write head section 1 and a read head section 2. FIG. 3 shows an enlarged view of the read head section. FIG. 3 is a view seen from a surface facing a magnetic disk medium (ABS surface, and a surface seen from A in FIG. 2). The magnetic head is formed using fine processing technology on an $Al_2O_3$—TiC (alumina-titanium carbide, hereinafter referred to as AlTiC) substrate. In respective figures including figures shown later, a substrate portion is omitted from the views for the sake of simplicity. A lower magnetic shield layer 3 and an upper magnetic shield layer 4, each including permalloy, serve as electrodes, which apply a current to a multilayer-film spin-valve-type magneto-resistive-effect film 5 to detect a magnetic field. Alumina insulating film 11 is used to isolate a portion of the magneto-resistive-effect film 5 that detects the magnetic field. In addition, a permanent magnetic film 6 applies a bias magnetic field and is disposed adjacent to the magneto-resistive-effect film 5.

Changes to the track width Tw and gap length Gs can be helpful from a viewpoint of increasing an areal recording density of information for a read head. The respective dimensions correspond to resolution in size in a radial direction (track width) and resolution in size in a circumferential direction (bit length) of a recording bit on a magnetic disk. Drastic increase in areal recording density up to the annual rate of 40% has been attained through reducing these dimensions. However, gap length Gs approximately reaches a technological limit of size reduction unlike the track width Tw. The reason for this is that while the track width Tw is to be obtained by processing a magneto-resistive-effect film and therefore may be reduced with improvement in fine patterning using advanced lithography technology, the gap length Gs has a physical limit that corresponds to a thickness large enough to accommodate at least a magnetic sensor. In currently mass-produced products, Tw from about 60 nm to 90 nm and Gs from about 30 nm to 40 nm are given as typical dimensions of the track width Tw and the gap length Gs, respectively. Either GMR or TMR heads are regarded to have a thickness of at least 25 nm to act as a spin valve, and therefore any method which can achieve a head which has a gap length Gs of 25 nm or less would be very beneficial.

A differential-type head is known to those of skill in the art as a technology that may achieve an ultra-narrow Gs head. FIG. 4 shows a structure and an equivalent circuit of a differential-type head. Two spin valves 15 and 16 are stacked as a read sensor, and a sense current 17 is flowed through the spin valves 15 and 16 so as to obtain a differential output between the two elements, so that a change in an external magnetic field can be detected. Resolution in a Gs direction corresponding to a recording bit length depends on a distance Gs between the shields in previous single element-type heads. However, the resolution of a differential-type head depends on a distance GL between free layers as magnetic detection films of the two elements. This leads to a possibility where GL can be reduced to a lower limit of Gs or less, so that the resolution of the head is improved. A technology using a differential-type read head is disclosed in Japanese Patent Office Pub. No. 3760095, for example.

While the possibility of improving resolution in the bit direction by a differential-type read head structure for HDD is previously known, the possibility has not been applied in practice because a manufacturing process of the head is too difficult to perform consistently. Moreover, even a previous single-element structured head has so far been able to meet the technical objectives by reducing thickness of a single-layer spin valve. However, such a reduction in thickness will soon reach the described technical limit. In addition, the following problems in a manufacturing process of the head exist currently.

A first problem of current techniques is that film characteristics of an upper element deposited later tend to be degraded, which is due to continuous deposition of the two elements. It has been reasoned that this is due to crystal growth of a previously deposited lower element which causes an increase in a roughness of a surface to be a foundation for the upper layer. A second problem of current techniques is that element characteristics tend to be degraded during an ion milling step for processing a sensor film including the deposited, two elements to have a desired track width. In the differential-type structure, since total thickness of the two elements, namely, thickness two times as large as previous thickness is subjected to processing, there is a high probability that element characteristics are degraded due to damage to the end face of the element exposed during processing, or due to redeposit caused by ion milling.

Therefore, a method of producing a differential-type head which avoids the problems currently associated with differential-type head construction would be greatly beneficial to reducing bit size and increasing areal density of HDDs.

SUMMARY OF THE INVENTION

According to one embodiment, a differential-type magnetic read head comprises a differential-type magneto-resistive-effect film formed on a substrate and a pair of electrodes for applying current to the differential-type magneto-resistive-effect film in a direction perpendicular to a film plane of the film. The differential-type magneto-resistive-effect film includes a first stacked film having: a first pinned layer; a first intermediate layer; and a first free layer. The differential-type magneto-resistive-effect film also includes a second stacked film formed on the first stacked film, the second stacked film having: a second pinned layer; a second intermediate layer; and a second free layer. A side face in a track width direction of the differential-type magneto-resistive-effect film is shaped to have an inflection point at an intermediate position in a thickness direction of the differential-type magneto-resistive-effect film, and the side face is shaped to be approximately vertical to the substrate in an upward direction of the substrate from the inflection point. Also, the side face is shaped to be gradually increased in track width as approaching the substrate in a downward direction of the substrate from the inflection point.

In another embodiment, a differential-type magnetic read head comprises a differential-type magneto-resistive-effect film formed on a substrate and a pair of electrodes for applying current to the differential-type magneto-resistive-effect film in a direction perpendicular to a film plane of the film. The differential-type magneto-resistive-effect film includes a first stacked film having: a first pinned layer; a first intermediate layer; and a first free layer. Also, the differential-type magneto-resistive-effect film includes a second stacked film formed on the first stacked film having: a second pinned layer, a second intermediate layer, and a second free layer. A side face defining stripe height of the differential-type magneto-resistive-effect film is shaped to have an inflection point at an intermediate position in a thickness direction of the differential-type magneto-resistive-effect film, and the side face is shaped to be approximately vertical to the substrate in an upward direction of the substrate from the inflection point. Also, the side face is shaped to be gradually increased in stripe height as approaching the substrate in a downward direction of the substrate from the inflection point.

In another embodiment, a method of manufacturing a differential-type magnetic read head comprises: forming a lower magnetic shield, and forming a differential-type magneto-resistive-effect film on the lower magnetic shield. The differential-type magneto-resistive-effect film includes a first stacked film having: a first pinned layer; a first intermediate layer; and a first free layer. Also, the differential-type magneto-resistive-effect film includes a second stacked film being formed on the first stacked film, the second stacked film having: a second pinned layer; a second intermediate layer; and a second free layer. A side face in a track width direction of the differential-type magneto-resistive-effect film is shaped to have an inflection point at an intermediate position in a thickness direction of the differential-type magneto-resistive-effect film, the side face is shaped to be approximately vertical to the substrate in an upward direction of the substrate from the inflection point, and the side face is shaped to be gradually increased in track width as approaching the substrate in a downward direction of the substrate from the inflection point. The method also includes forming a pair of electrodes for applying current to the differential-type magneto-resistive-effect film in a direction perpendicular to a film plane of the film, forming a mask pattern having a track width Tw, a height h, and side faces shaped to be approximately vertical on the differential-type magneto-resistive-effect film, and ion milling the differential-type magneto-resistive-effect film using the mask pattern. A total amount of the ion milling is at least $2*(t-t1-GL)$ and no greater than $2*t$ in milling thickness on a flat portion as a reference, where t is a total thickness of the differential-type magneto-resistive-effect film, t1 is a thickness from a substrate side end of the differential-type magneto-resistive-effect film to a center of the first free layer, GL is a thickness from the center of the first free layer to a center of the second free layer, and $\theta$ is an ion incident angle which is defined with respect to a substrate normal direction as $\tan\theta \leq 0.3*Tw*(GL+t1)/(GL*(t+h))$.

According to another embodiment, a method of manufacturing a differential-type magnetic read head comprises: forming a lower magnetic shield, forming the stacked film on the lower magnetic shield, forming a mask pattern on the stacked film, and ion milling to form a side face defining track width of the stacked film using the mask pattern. A total amount of ion milling is at least $2*(t-t1)$ and no greater than $2*t$ in milling thickness on a flat portion as a reference, where t is a total thickness of the stacked film, and t1 is a thickness from a substrate side end of the stacked film to a center of a first magnetic detection film. A stacked film to have current applied in a direction perpendicular to a film plane of the stacked film includes at least two magnetic detection films in a stacked orientation exhibiting a magneto-resistive effect, and the stacked film differentially uses signals from the at least two magnetic detection films.

In another embodiment, a method of manufacturing a differential-type magnetic read head comprises: forming a lower magnetic shield, forming the stacked film on the lower magnetic shield, forming a mask pattern on the stacked film, ion milling to form a side face defining track width or stripe height of the stacked film using the mask pattern, and oxidizing the processed side face after the ion milling. A stacked film to have current applied in a direction perpendicular to a film plane of the stacked film includes at least two magnetic detection films in a stacked orientation exhibiting a magneto-resistive effect, and the stacked film differentially uses signals from the at least two magnetic detection films.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
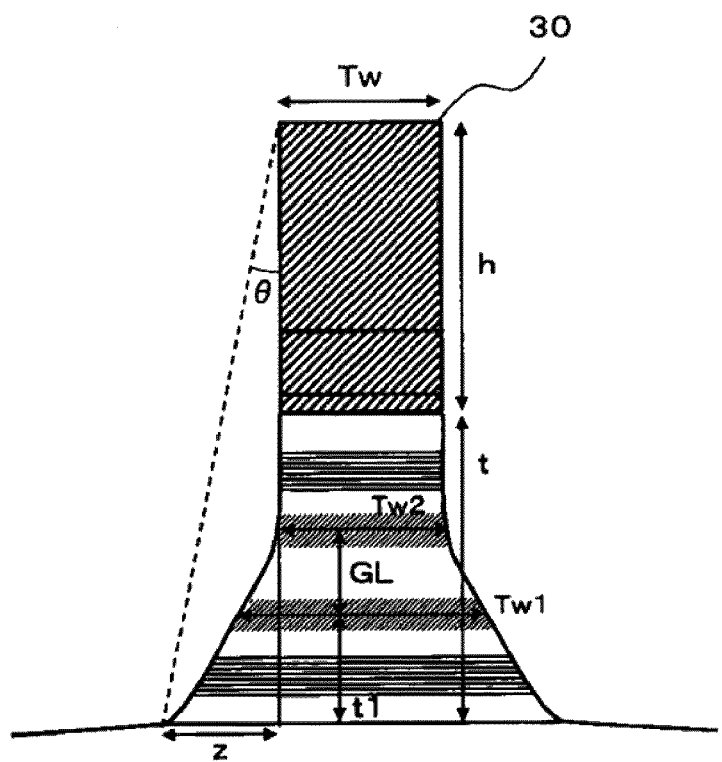
FIG. 1 is an explanatory view schematically showing a structure of a differential-type magnetic read head of a first example.
Figure 2:
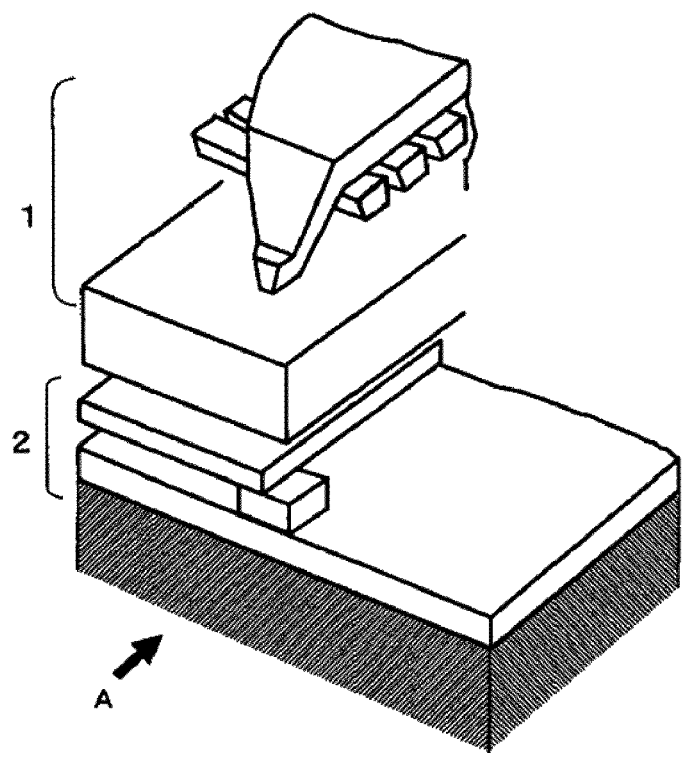
FIG. 2 is an explanatory view schematically showing a recording/reproducing separated head.
Figure 3:
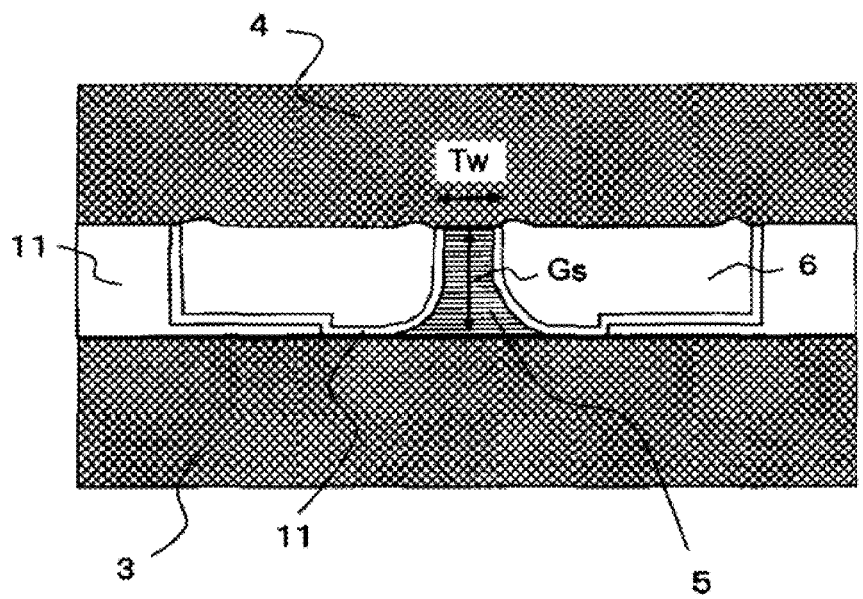
FIG. 3 is an explanatory view showing an enlarged section of a magnetic read head portion, according to one embodiment.
Figure 4:
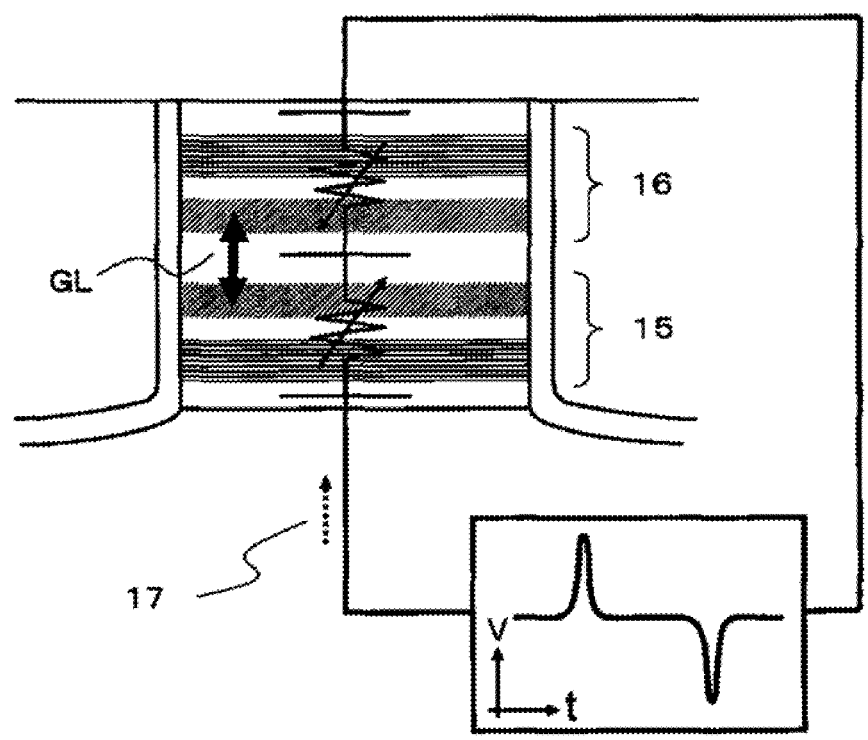
FIG. 4 is an explanatory view showing a structure of the differential-type magnetic read head and an equivalent circuit thereof, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a differential-type magnetic read head comprise a differential-type magneto-resistive-effect film formed on a substrate; and a pair of electrodes for applying current to the differential-type magneto-resistive-effect film in a direction perpendicular to a film plane of the film, wherein the differential-type magneto-resistive-effect film includes a first stacked film having: a first pinned layer; a first intermediate layer; and a first free layer; and wherein the differential-type magneto-resistive-effect film includes a second stacked film formed on the first stacked film, the second stacked film having: a second pinned layer; a second intermediate layer; and a second free layer; and wherein a side face in a track width direction of the differential-type magneto-resistive-effect film is shaped to have an inflection point at an intermediate position in a thickness direction of the differential-type magneto-resistive-effect film, wherein the side face is shaped to be approximately vertical to the substrate in an upward direction of the substrate from the inflection point, and wherein the side face is shaped to be gradually increased in track width as approaching the substrate in a downward direction of the substrate from the inflection point.

In another general embodiment, a differential-type magnetic read head comprises a differential-type magneto-resistive-effect film formed on a substrate; and a pair of electrodes for applying current to the differential-type magneto-resistive-effect film in a direction perpendicular to a film plane of the film, wherein the differential-type magneto-resistive-effect film includes a first stacked film having: a first pinned layer; a first intermediate layer; and a first free layer; and wherein the differential-type magneto-resistive-effect film includes a second stacked film formed on the first stacked film having: a second pinned layer, a second intermediate layer, and a second free layer; and wherein a side face defining stripe height of the differential-type magneto-resistive-effect film is shaped to have an inflection point at an intermediate position in a thickness direction of the differential-type magneto-resistive-effect film, wherein the side face is shaped to be approximately vertical to the substrate in an upward direction of the substrate from the inflection point, and wherein the side face is shaped to be gradually increased in stripe height as approaching the substrate in a downward direction of the substrate from the inflection point.

In another general embodiment, a method of manufacturing a differential-type magnetic read head comprises: forming a lower magnetic shield; forming a differential-type magneto-resistive-effect film on the lower magnetic shield, wherein the differential-type magneto-resistive-effect film includes a first stacked film having: a first pinned layer; a first intermediate layer; and a first free layer, and wherein the differential-type magneto-resistive-effect film includes a second stacked film being formed on the first stacked film, the second stacked film having: a second pinned layer; a second intermediate layer; and a second free layer, wherein a side face in a track width direction of the differential-type magneto-resistive-effect film is shaped to have an inflection point at an intermediate position in a thickness direction of the differential-type magneto-resistive-effect film, wherein the side face is shaped to be approximately vertical to the substrate in an upward direction of the substrate from the inflection point, and wherein the side face is shaped to be gradually increased in track width as approaching the substrate in a downward direction of the substrate from the inflection point; forming a pair of electrodes for applying current to the differential-type magneto-resistive-effect film in a direction perpendicular to a film plane of the film; forming a mask pattern having a track width Tw, a height h, and side faces shaped to be approximately vertical on the differential-type magneto-resistive-effect film; and ion milling the differential-type magneto-resistive-effect film using the mask pattern, wherein a total amount of the ion milling is at least $2*(t-t1-GL)$ and no greater than $2*t$ in milling thickness on a flat portion as a reference, wherein t is a total thickness of the differential-type magneto-resistive-effect film, t1 is a thickness from a substrate side end of the differential-type magneto-resistive-effect film to a center of the first free layer, GL is a thickness from the center of the first free layer to a center of the second free layer, and θ is an ion incident angle which is defined with respect to a substrate normal direction as $\tan\theta \leq 0.3*Tw*(GL+t1)/(GL*(t+h))$.

In another general embodiment, a method of manufacturing a differential-type magnetic read head comprises: forming a lower magnetic shield; forming the stacked film on the lower magnetic shield; forming a mask pattern on the stacked film; and ion milling to form a side face defining track width of the stacked film using the mask pattern, wherein a total amount of ion milling is at least $2*(t-t1)$ and no greater than $2*t$ in milling thickness on a flat portion as a reference, wherein t is a total thickness of the stacked film, and t1 is a thickness from a substrate side end of the stacked film to a center of a first magnetic detection film, wherein a stacked film to have current applied in a direction perpendicular to a film plane of the stacked film includes at least two magnetic detection films in a stacked orientation exhibiting a magneto-resistive effect, and wherein the stacked film differentially uses signals from the at least two magnetic detection films.

In another general embodiment, a method of manufacturing a differential-type magnetic read head comprises: forming a lower magnetic shield; forming the stacked film on the lower magnetic shield; forming a mask pattern on the stacked film; ion milling to form a side face defining track width or stripe height of the stacked film using the mask pattern; and oxidizing the processed side face after the ion milling, wherein a stacked film to have current applied in a direction perpendicular to a film plane of the stacked film includes at least two magnetic detection films in a stacked orientation exhibiting a magneto-resistive effect, and wherein the stacked film differentially uses signals from the at least two magnetic detection films.

To complement the above description, the problems are clarified below along a manufacturing process flow of the differential-type read head. FIGS. 5-11 show schematic views of a process flow of a read head portion on an AlTiC substrate in an enlarged manner. A right view (b) of each figure is a section view seen from an ABS surface, and a left view (a) is a view seen from a side corresponding to a top of a wafer perpendicularly to the section view.

Figure 5:
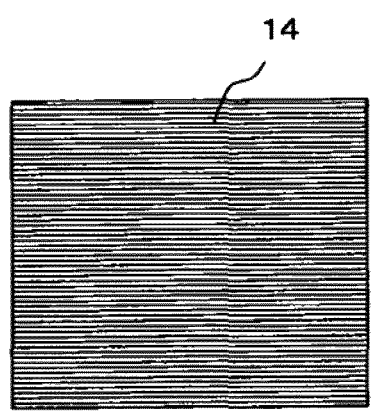
FIG. 5 includes explanatory views schematically showing a manufacturing process flow of the differential-type magnetic read head, according to one embodiment.
Figure 5:
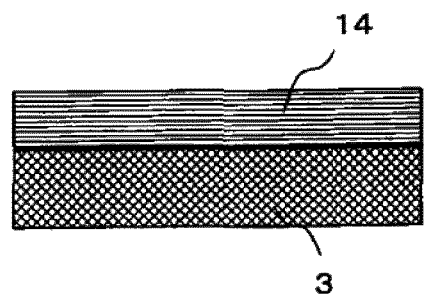
Figure 6:
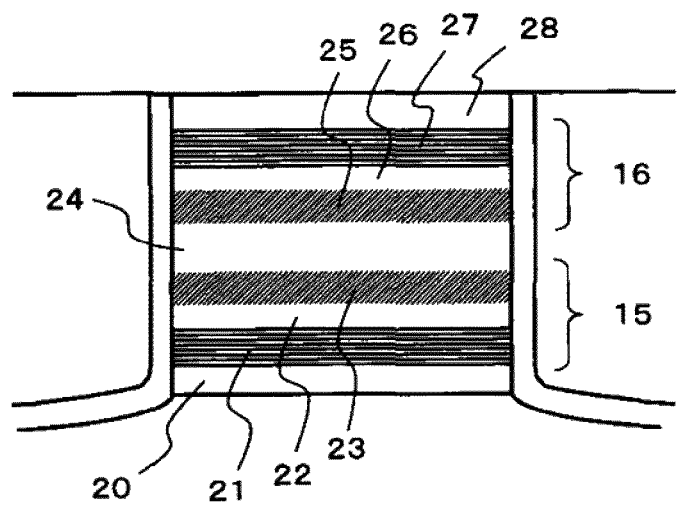
FIG. 6 is an explanatory view of a structure for each function of a magneto-resistive-effect film of the differential-type magnetic read head, according to one embodiment.

FIG. 5 shows a stage where a lower magnetic shield layer 3 including permalloy is formed, then a spin-valve-type magneto-resistive-effect film 14 having a differential structure is deposited thereon. The magneto-resistive-effect film 14 has a complicated multilayer film configuration. While details are omitted, FIG. 6 shows a structure of the film for each of the functions. A lower element 15 has a structure where an underlying layer 20, a pinned layer 21, an insulating layer 22, and a free layer 23 are sequentially stacked like a typical spin valve. Then, a free layer 25, an insulating layer 26, and a pinned layer 27 of an upper element 16 are stacked thereon in a reverse layout to the lower element via a nonmagnetic intermediate layer 24 including tantalum (Ta) or ruthenium (Ru). Here, a TMR film is selected as the spin valve. In the case of CPP-GMR, the intermediate layer is replaced by an insulating layer. The upper free layer 25 in a later deposition order is formed on the nonmagnetic intermediate layer 24 unlike the lower free layer. However, the nonmagnetic intermediate layer 24 is typically thick compared with the underlying layer 20, and therefore roughness tends to be increased by crystal growth during deposition. Surface irregularity accumulated during a formation process of the lower element is added to such increased roughness, leading to degradation of underlayer quality during deposition of the upper element, and consequently respective characteristics of the upper and lower elements are already uneven in a deposition stage in many cases. In differential operation, since a difference between outputs from the two elements leads to baseline shift as described later, how to compensate a difference in characteristics in the deposition process is the first problem addressed.

Figure 7:
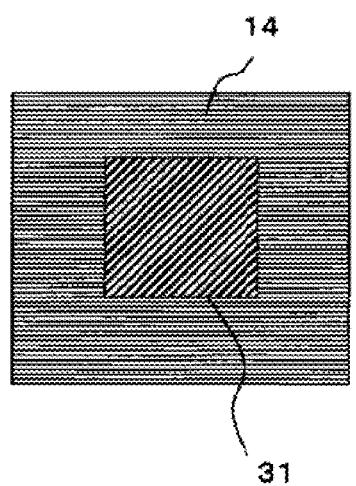
FIG. 7 includes explanatory views schematically showing the manufacturing process flow of the differential-type magnetic read head continued from FIG. 5, according to one embodiment.
Figure 7:
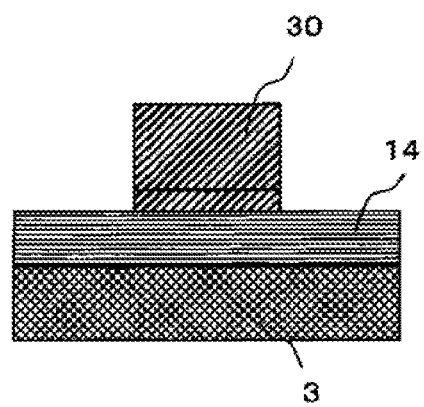

After deposition, processing of a stripe height pattern is performed. As shown in FIG. 7, a photoresist layer 30 is coated, then a stripe height pattern 31 is formed by photolithography. For forming the stripe height pattern 31, how deep the magneto-resistive-effect film exists in a normal direction of an ABS surface of a magnetic head is determined. As the photoresist layer 30, a photoresist layer having a two-layer configuration, in which a lower layer acts as a release layer, may be used, with releasability in a later liftoff step being a material selection criteria. Then, the magneto-resistive-effect film is removed using any technique known in the art, such as ion milling. In this stage, since the processing time is long compared with a processing time for a prior art element, a side face 32 (refer to FIG. 8) of the exposed magneto-resistive-effect film may be damaged by incident ions of ion milling, or conductive redeposition may induce short-circuiting on a wall surface during milling. In particular, the upper element, of which the end face is first exposed, may be much more significantly degraded. This is the second problem described previously.

Figure 8:
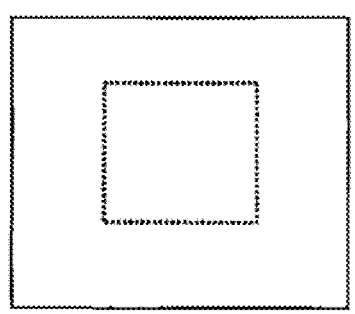
FIG. 8 includes explanatory views schematically showing the manufacturing process flow of the differential-type magnetic read head continued from FIG. 7, according to one embodiment.
Figure 8:
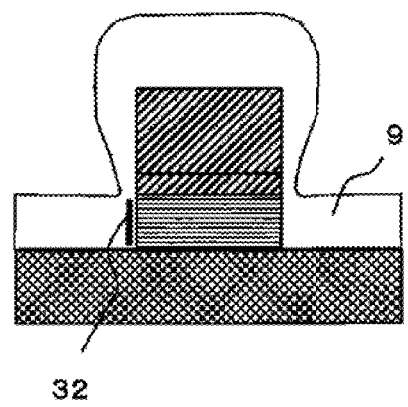
Figure 9:
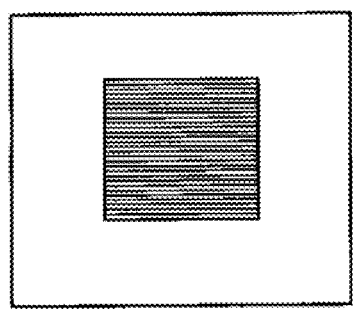
FIG. 9 includes explanatory views schematically showing the manufacturing process flow of the differential-type magnetic read head continued from FIG. 8, according to one embodiment.
Figure 9:
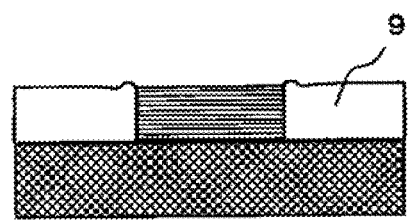
Figure 10:
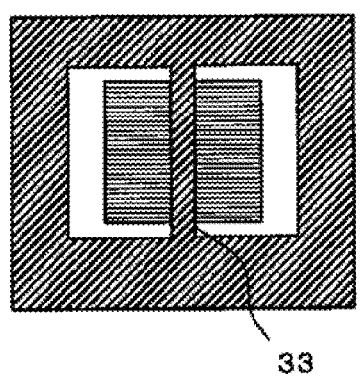
FIG. 10 includes explanatory views schematically showing the manufacturing process flow of the differential-type magnetic read head continued from FIG. 9, according to one embodiment.
Figure 10:
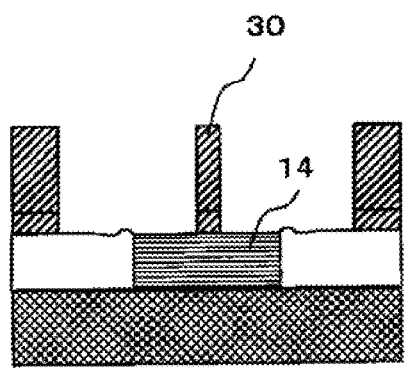

FIG. 8 shows a subsequent stage where, for example, alumina 9 is deposited as the insulating film. Then, a resist and an insulating film on the magneto-resistive-effect film are removed by liftoff, leading to a condition as shown in FIG. 9. Next, a track width pattern 33 is formed. A track width pattern may be formed using any technique known in the art, such as using a photoresist layer 30 as previously described by using photolithography as shown in FIG. 10. The track width pattern is transferred to the element by ion milling. Even in this case, an exposed end face of the magneto-resistive-effect film is degraded by ion milling, and particularly the upper element is more significantly degraded. The processing of track width has a great influence on performance because track width is long compared with the stripe height in circumferential length in a finally shaped head. In addition, the processing is required to have higher processing accuracy in order to be successful. Therefore, such degradation during the processing of track width is particularly serious, as described previously regarding the second problem.

Figure 11:
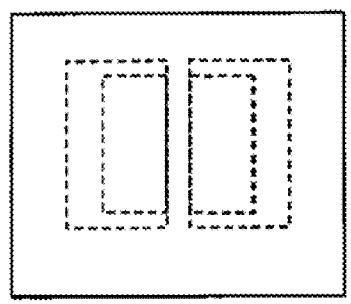
FIG. 11 includes explanatory views schematically showing the manufacturing process flow of the differential-type magnetic read head continued from FIG. 10, according to one embodiment.
Figure 11:
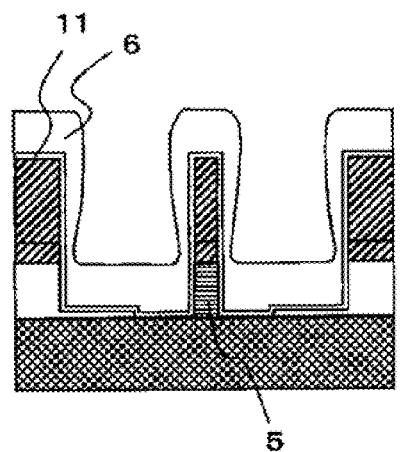
Figure 12:
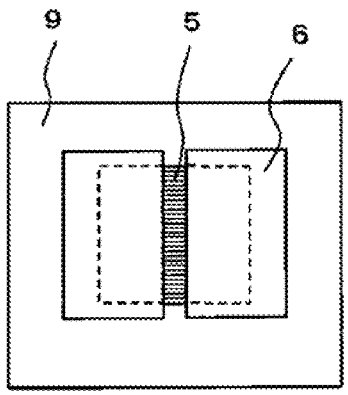
FIG. 12 includes explanatory views schematically showing the manufacturing process flow of the differential-type magnetic read head continued from FIG. 11, according to one embodiment.
Figure 12:
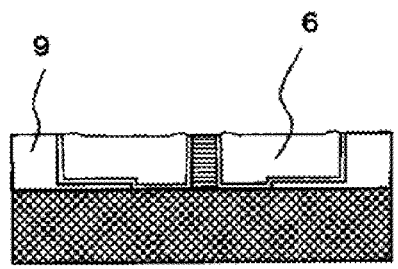

Next, a portion of the magneto-resistive-effect film and a portion of the insulating film are removed, and then an insulating film 11, such as a thin alumina film on a sidewall of the magneto-resistive-effect film, and a permanent magnet film 6 (hard bias film) are deposited, leading to a structure as shown in FIG. 11. The hard bias film 6 acts as a permanent magnet that applies a bias magnetic field to the magneto-resistive-effect element 5, and for example, an alloy film including cobalt-chromium-platinum (Co—Cr—Pt) may be used for the hard bias film. A photoresist layer, an insulating film, and a hard bias film on the magneto-resistive-effect film are removed by liftoff, leading to a structure as shown in FIG. 12, and consequently a basic structure of a reproducing sensor is completed.

After that, while views of the corresponding structure are omitted, permalloy is deposited as the upper magnetic shield layer, and then a step of directly forming a write head above the read head is performed. In the example, the stripe height pattern is first processed, and then the track width pattern is processed. However, an element is subjected to processing in a reverse order according to some approaches, for example, in order of track width processing and stripe height processing.

Figure 13:
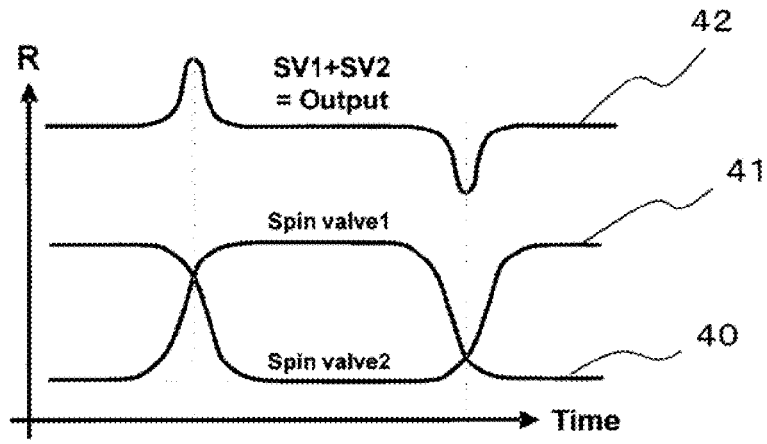
FIG. 13 is a schematic diagram of output waveforms of the differential-type head.
Figure 14:
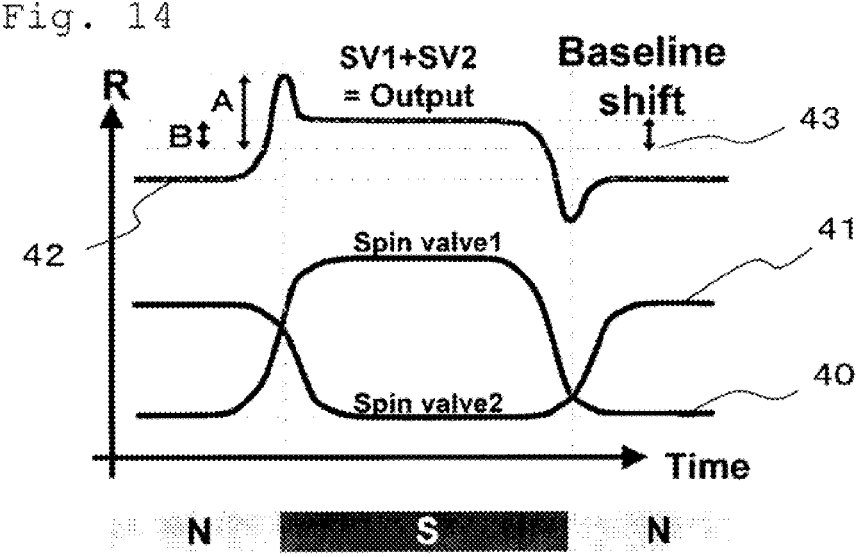
FIG. 14 is a schematic diagram of output waveforms of the differential-type head where an output difference exists between two elements.

A particular problem of baseline shift occurring due to a mismatch between outputs of the two elements of a differential-type read head is sometimes encountered even when the read head is successfully manufactured. FIG. 13 shows a schematic diagram of output waveforms of a differential-type head. For ease in understanding, output of the element 1 is shown as 40, and output of the element 2 is shown as 41, the elements comprising the differential-type head. Sum of resistances of the elements being connected in series is obtained as output 42 of a differential element. The elements 1 and 2 are different in parity of number of exchange coupling layers between the pinned layers such that the elements respond to an external magnetic field with opposite polarities to each other. Therefore, outputs of the elements 1 and 2 are cancelled by each other under an ideal, uniform magnetic field, and consequently output of the differential element is flat. Since positions of the magnetic detection films, namely, positions of the free layers of respective elements are separated by distance GL, the moment at which magnetization transition of a medium (e.g., a HDD disk) is sensed is different between the elements, and such a difference appears as a differential output signal. Therefore, the differential output signal is obtained only at a magnetization transition point at which an external magnetic field is changed, which shows that the differential-type read head acts as a differential sensor. FIG. 14 shows a schematic diagram of output waveforms where a difference exists between outputs of two elements in the same configuration. Output of the element 2 is lower than output of the element 1. In sum 42 of the outputs, baseline shift 43 is observed, in which a flat portion of a signal is shifted depending on a polarity of a magnetic field. A degree of the baseline shift is defined by B/A (%) in FIG. 14. If the baseline shift occurs, an error rate as a final performance index of the differential-type read head is detrimentally degraded.

In the light of such problems, the invention, according to some approaches, provides a method of manufacturing a differential-type read head, by which outputs of two elements of the head can be balanced.

Figure 15:
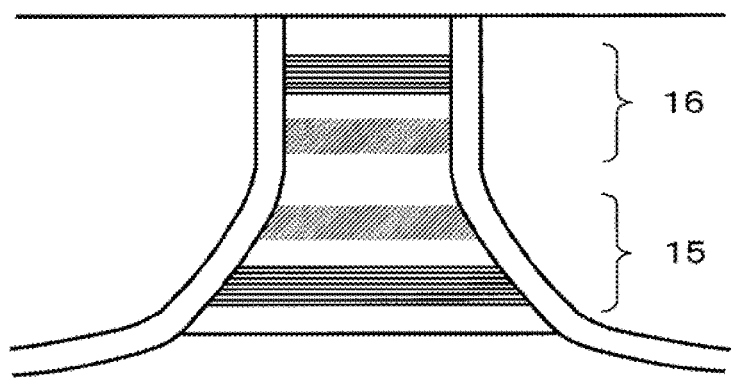
FIG. 15 is an explanatory view showing a half taper shape, according to one embodiment.

According to one embodiment, an ion milling step for processing a magneto-resistive-effect film is performed in such a manner that a side face of the magneto-resistive-effect film is shaped to have an inflection point at an intermediate position in a thickness direction, and the side face is formed approximately vertically in an upward direction of a substrate from the inflection point, and the side face is shaped to gradually increase in track width, that is, formed into a half taper in a downward direction of the substrate from the inflection point. In order to form a half taper shape as shown in FIG. 15, it is enough that at least one ion milling step is included, in which a mask pattern having track width Tw, height h, and sidewalls shaped approximately vertically is used. In the following equations, t is a total thickness of the stacked films of a magneto-resistive-effect film including two elements 15 and 16, t1 is a thickness from a substrate side end of the film to a center of a first magnetic detection film, GL is a thickness from the center of the first magnetic detection film to a center of a next magnetic detection film, and θ is an ion incident angle of ion milling which is defined with respect to a substrate normal direction and satisfies Equation 1.

$$\tan\theta = 0.3 * Tw * (GL + t1) / (GL * (t+h))\quad\text{Equation 1}$$

Also, a total amount of ion milling in milling thickness on a flat portion as a reference is represented by Equation 2.

$$2*(t-t1-GL) \leq \text{Total Ion Milling} \leq 2*t \quad\text{Equation 2}$$

In the above, when track widths at respective centers of two magnetic detection films of a differential-type magnetic read head are represented as Tw1 and Tw2, respectively, a ratio between the track widths Tw1/Tw2 is within a range of about 1.0 to about 1.59.

In particular, when the two elements have the same magneto-resistive-effect characteristic, ion milling is performed such that the total amount of ion milling of the magneto-resistive-effect film including the two elements is at least $2*(t-t1)$ not more than $2*t$ in milling thickness on a flat portion as a reference, thereby a half taper shape, in which the track width Tw1 and Tw2 of the two elements are equal to each other, can be formed without depending on a milling incident angle.

Moreover, a differential-type magneto-resistive-effect film, which is thick compared with a typical magneto-resistive-effect film, is subjected to ion milling processing for a long time. In such ion milling processing, a step of forcibly oxidizing a processed side face by ozone or the like may be provided after the ion milling processing in order to prevent shunt (short circuiting) due to conductive materials re-depositing during ion milling on an exposed end face of an element, particularly on an upper end face being first exposed. Thus, a problem peculiar to processing of the differential-type magneto-resistive-effect film can be solved.

Figure 16:
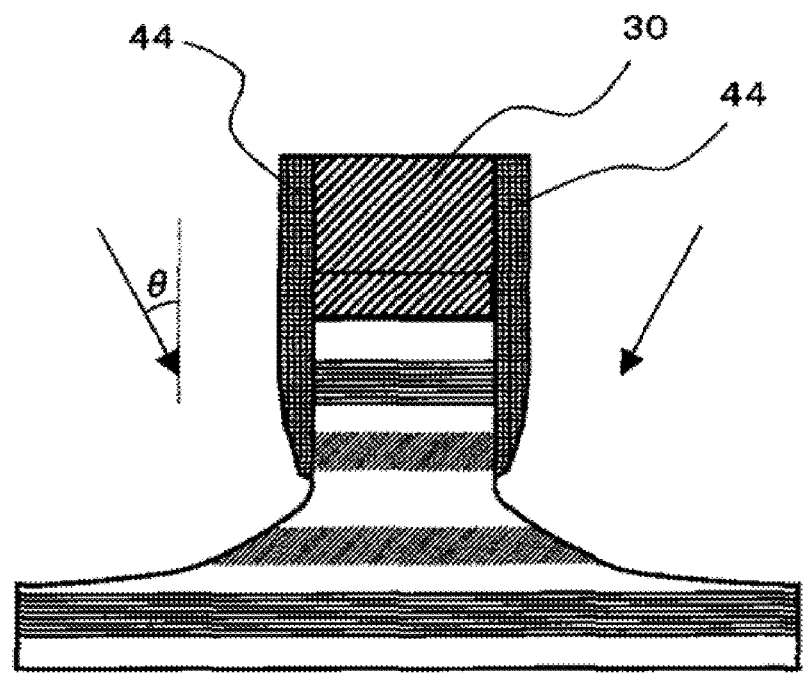
FIG. 16 is an explanatory view schematically showing an aspect of re-deposition during ion milling processing, according to one embodiment.

A first advantage provided by the half taper shape, according to some approaches, is that re-deposition by ion milling on end faces of the stacked two elements can be prevented. In a differential-type stacked magneto-resistive-effect film, which is thick compared with a typical magneto-resistive-effect film, an end face of the upper element, which is first exposed during ion milling processing, tends to have redeposit thereon. This effect is shown in FIG. 16. Since redeposit 44 mainly includes a metal conductor removed by ion milling, if such a metal conductor is deposited on the end face of the magneto-resistive-effect film, it forms an undesirable conductive path. The conductive path is a parallel resistance having no magneto-resistive effect in an equivalent circuit, which reduces an effective magneto-resistive output. When a half taper is formed by adjusting an ion milling incident angle, since re-deposition hardly occurs in the latter half of an ion milling step, in which the end face of the magneto-resistive-effect film is exposed, ion milling processing can be performed with characteristics of the two elements being less degraded even in the case of the differential-type magneto-resistive-effect film. To simply minimize re-deposition, a full taper is preferably formed, in which an element is tapered from a top in a thickness direction of the element. However, in the differential-type structure, the full taper leads to too large of a difference in track width between the two elements, and leads to a situation where mask width is less than a minimum dimension, above which a dimension can be stably formed by lithography, in a small size of track width of about 100 nm or less for a generation where the differential type structure is practically used. Consequently, the mask width is geometrically hardly formed. Only by the half taper, fine track processing may be advantageously combined with prevention of re-deposition.

A second advantage provided by the half taper shape is that correction of respective outputs of the two elements can be performed by adjusting track width or stripe height. In the differential-type structure, when magneto-resistive-effect films of two elements are stacked, since roughness of a film surface is increased by crystal growth or the like during deposition of the elements, an upper element is deposited on a rough surface of a lower element and therefore tends to be degraded in characteristics. As a result, output of the upper element is relatively reduced, leading to an imbalance between the two elements. In the half taper shape, the upper and lower elements may have a difference in area in order to compensate such imbalance. Since a sense current flows in a direction perpendicular to a film plane of the element, element resistance is inversely proportional to element area. When track width or stripe height of the lower element being higher in output is increased to expand element area, element resistance is reduced, so that output is reduced. A half taper shape is formed, in which an appropriate difference is provided between areas of two elements so as to balance outputs of the two elements, thereby a differential-type head can be achieved which has excellent output balance between elements even if characteristics of films are different from each other. As a result, waveform distortion in a differential-type element can be suppressed, leading to an improvement in error rate.

Moreover, according to one embodiment, a method in which an end face of the element is forcibly oxidized after processing of a differential-type magneto-resistive-effect film advantageously prevents shunting (short circuiting) due to conductive materials being re-deposited on an end face exposed during ion milling, particularly on an end face of the upper element portion. In ion milling, a certain degree of re-deposition inevitably occurs in some cases, for example, in a case where processing shape is taken into account and thus almost a vertical angle is used as an ion incident angle. On the other hand, when an insulative intermediate layer, such as a TMR-type spin valve, is used for the magneto-resistive-effect film, even if a shunt is formed by only a small amount of re-deposited conductive material, the shunt becomes a main current path, leading to significant degradation of sensor characteristics. A step of forcibly oxidizing a processed end face by ozone or the like is provided after ion milling processing, thereby the small amount of re-deposited metal or the like is oxidized to be changed into an insulator, so that the shunt is advantageously prevented.

Figure 17:
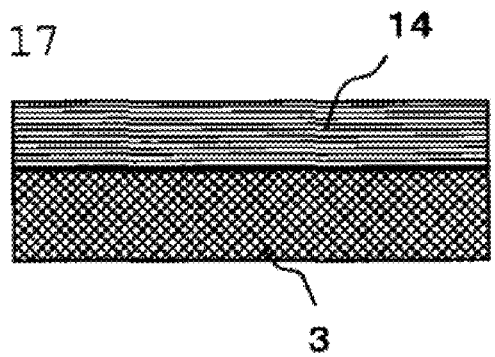
FIG. 17 is an explanatory view schematically showing a manufacturing process flow of the first example, according to one embodiment.

In one example, in a process of manufacturing a wafer of a magnetic read head, steps are the same as those shown in FIG. 5 in and before a stage where permalloy 3 is deposited as wiring combined with the lower magnetic shield on an AlTiC substrate. Since steps prior to the stage are the same as those in a manufacturing process of a magnetic read head using a typical magneto-resistive-effect element, description of the steps is omitted. A wafer section shown herein corresponds to an ABS surface (Air Bearing Surface, or medium facing surface) after a magnetic head is completed. FIG. 17 shows a stage that surface irregularity occurring during depositing the lower magnetic shield is flattened by CMP, then a multilayer-film magneto-resistive-effect film 14 is deposited. Since the magneto-resistive-effect film 14 has a differential-type configuration, the film is in a structure where two spin valves are stacked. A nonmagnetic intermediate layer is interposed between the spin valves, so that the film 14 has a stacked structure of spin valve/nonmagnetic intermediate layer/spin valve. Each spin valve is configured of a free layer, an intermediate layer, and a pinned layer. In the upper and lower spin valves, the respective free layers are symmetrically arranged with the intermediate layer between them. When the differential-type magneto-resistive-effect film as a whole is described in order from a top for each of functions including the configuration of the spin valve, cap layer/pinned layer/intermediate layer/free layer/nonmagnetic intermediate layer/free layer/intermediate layer/pinned layer/underlying layer is given. This aspect is as shown in FIG. 6. In detail, each pinned layer has a stacked pinned layer structure using a stacked structure of ferromagnetic layer/Ru/ferromagnetic layer to be exchange-coupled with an antiferromagnetic material.

A feature of the differential structure via the nonmagnetic intermediate layer is that thickness of the nonmagnetic intermediate layer can be freely set, so that a gap length, which is optimized for a pitch of magnetization transition required in a technology generation to be applied with the structure, can be achieved. A magnetization pinning direction of the upper element needs to be reversed to a magnetization pinning direction of the lower element for differential operation, and therefore number of exchange coupling layers is configured to be different in parity between the respective pinned layers of the upper and lower elements. Here, the number of exchange coupling layers was three in the lower element, and two in the upper element. A CPP-GMR element in an all-metal-type, which had low resistance even if track width was narrow, was used for the spin valve.

Figure 18:
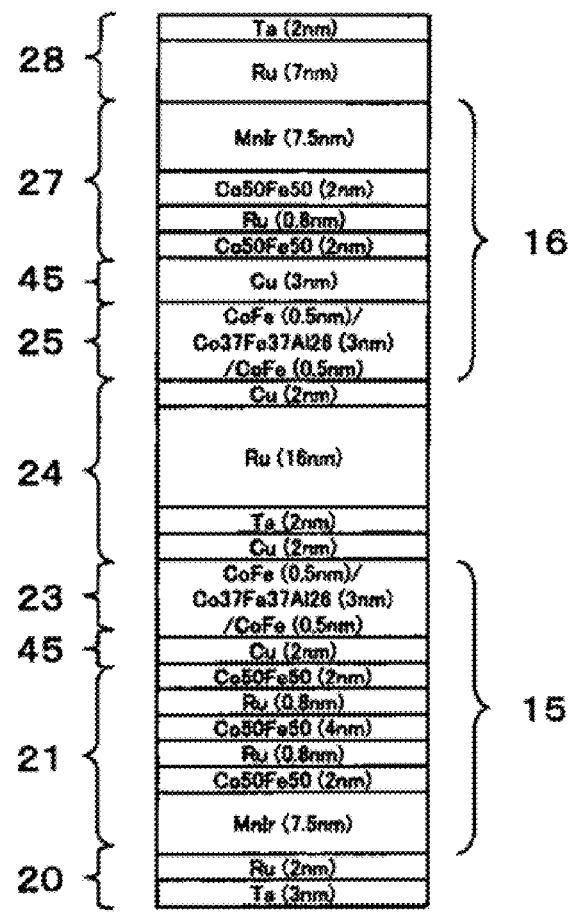
FIG. 18 is an explanatory view showing details of the magneto-resistive-effect film in the first example, according to one embodiment.

FIG. 18 shows details of a film configuration, according to one approach. The lower element 15 is formed on the underlying layer 20, the upper element 16 is formed thereon via the nonmagnetic intermediate layer 24, and the cap layer 28 is formed thereon. The lower element 15 includes the pinned layer 21, an intermediate layer 45, and the free layer 23. The upper element 16 includes a free layer 25, an intermediate layer 45, and the pinned layer 27, which are stacked on the nonmagnetic intermediate layer 24. Total thickness of the magneto-resistive-effect film is about 78 nm, which is about two times as large as typical thickness of about 30 to 40 nm. A magneto-resistance ratio (MR ratio) of each of the upper and lower elements, which is measured after deposition, is 4.2% in the upper element, and 5.6% in the lower element, that is, the ratio is larger in the lower element.

Figure 19:
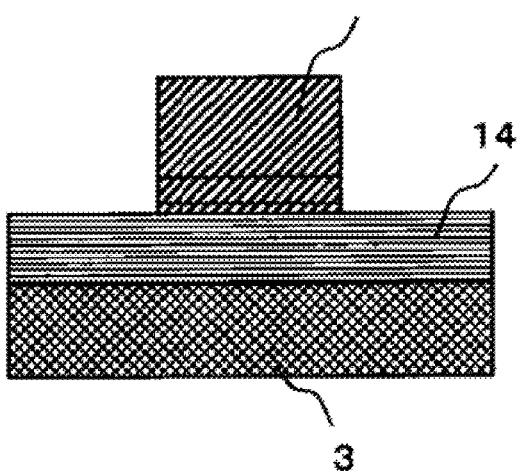
FIG. 19 is an explanatory view schematically showing the manufacturing process flow of the first example continued from FIG. 17, according to one embodiment.
Figure 20:
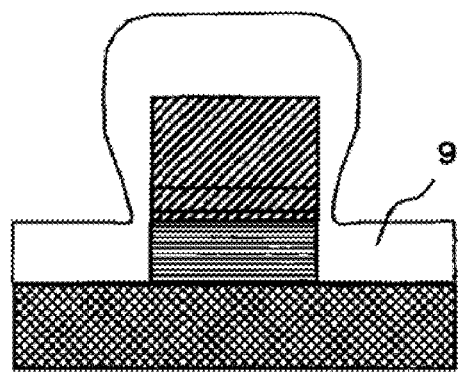
FIG. 20 is an explanatory view schematically showing the manufacturing process flow of the first example continued from FIG. 19, according to one embodiment.
Figure 21:
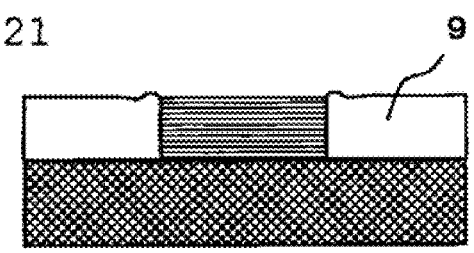
FIG. 21 is an explanatory view schematically showing the manufacturing process flow of the first example continued from FIG. 20, according to one embodiment.

Next, a stripe height pattern is formed, according to one approach. As shown in FIG. 19, a photoresist layer 30 is coated, and then stripe height pattern is formed by photolithography. In detail, the photoresist layer 30 is used in a form of three-layer-configuration mask of photoresist/polyimide/DLC (diamond-like carbon film). The polyimide has a role of supplementing mask resistance, which is insufficient with the photoresist alone, in a later ion milling step. The DLC has a role of protecting a surface of the magneto-resistive-effect film in a still later CMP liftoff step. In addition, the polyimide acts as a release layer in the liftoff step. A pattern is formed in the photoresist by lithography, and the pattern is transferred to the polyimide/DLC by RIE (Reactive Ion Etching) using the photoresist as a mask. Then, a magneto-resistive-effect film is removed using ion milling with the photoresist as a mask, and the alumina 9 is deposited as the insulating film. This stage is shown in FIG. 20, in one embodiment. A resist and an insulating film on the magneto-resistive-effect film are removed by typical liftoff using an ultrasonic wave and a release liquid, and typical CMP liftoff, leading to a structure as shown in FIG. 21, and a formation step of the stripe height pattern is finished.

Figure 22:
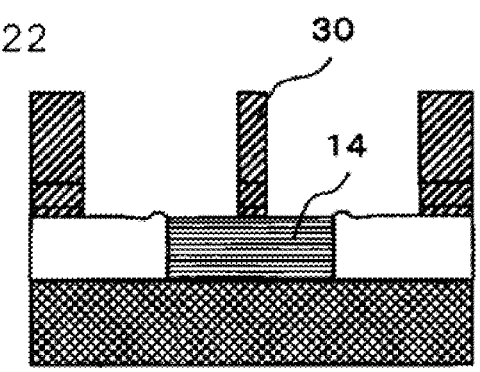
FIG. 22 is an explanatory view schematically showing the manufacturing process flow of the first example continued from FIG. 21, according to one embodiment.

Next, a track width pattern is formed in some approaches. A three-layer configuration mask 30 for forming the track width pattern is coated, then a pattern of track width Tw=60 nm is exposed and developed by a lithography apparatus, and then a mask pattern is formed using RIE. This stage is shown in FIG. 22, in some approaches. The differential-type structure is advantageous in that a high resolution characteristic corresponding to the short gap length, which cannot be achieved by a previous single-layer spin valve, can be achieved by reducing the distance GL between free layers. Specifically, this is particularly advantageous in a generation that uses 25 nm or less as a gap length distance GL between free layers. In this case, the track width Tw may be at most 100 nm considering an aspect ratio of medium recording magnetization (a distance in a track direction of a recording bit: width in a track width direction).

In detail, the mask 30 includes a three-layer structure of photoresist/polyimide/DLC (diamond-like carbon film) from a top as in the formation step of the stripe height pattern. Similarly, patterning is performed as in the stripe height pattern, that is, a pattern is transferred to the polyimide/DLC as an underlayer by RIE with the photoresist as a mask. Next, the mask 30 in such a condition is used to transfer a track pattern to the magneto-resistive-effect film 14 by ion milling. While a section during ion milling was previously shown in FIG. 16, the magneto-resistive-effect film is physically removed by argon ions injected at an angle θ with respect to a wafer normal. A portion covered with the mask 30 and a portion shaded by the mask from the injected ions are not removed. Since a wafer is rotated by 360° during milling, respective portions shaded and unshaded by the mask are changed from each other and thus averaged, and consequently the shaded portion is also removed by roughly half of the unshaded portion. According to such a mechanism, a taper is typically formed with a masked portion as a center after ion milling.

Here, in some approaches, milling was performed at an angle of 10° using a mask 60 nm in height. Moreover, if milling is performed at an acute angle of 40° or less from the beginning, an exposed end face of a film tends to have redeposit thereon; therefore, a milling step is added by a certain amount of milling at an injection angle of 70°, or approximately laterally, for a time being 30% to 100% of time of a previous step. Since the differential-type magneto-resistive-effect film is a thick film, three sets of milling were performed in sets of milling at 10° and milling at 70°, that is, multistep milling of six steps in total were performed. Total amount of milling was about 80 nm as the sum of total thickness, 78 nm of the magneto-resistive-effect film and over-milling of 2 nm in thickness on a flat portion.

Figure 23:
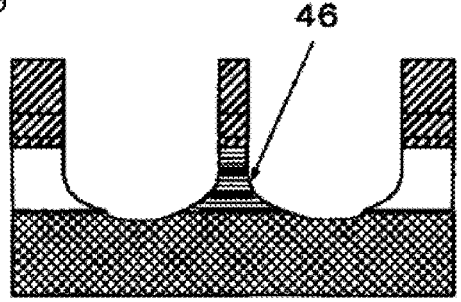
FIG. 23 is an explanatory view schematically showing the manufacturing process flow of the first example continued from FIG. 22, according to one embodiment.

FIG. 23 shows a section after milling, according to some embodiments. A track is shaped to have an inflection point 46, and a half taper shape can be formed, in which track width Tw1 of the lower element is 80 nm, track width Tw2 of the upper element is 60 nm, and a ratio between the track widths satisfies Tw1/Tw2~1.33. In particular, a position of the inflection point 46 is preferably located between the respective free layers that determine effective track width of each of the upper and lower elements. At that time, while a desired difference is provided between track widths of the upper and lower elements, some upper mask width is secured even in forming a narrow track element so that processing is facilitated.

The track widths are differently formed at a rate of 80/60, thereby a resistance ratio between the elements is 3/4 being an inverse ratio to the track width ratio. In the light of a film characteristic, the MR ratios of the upper and lower elements are not balanced and in a rate of 5.6/4.2. However, when resistance change as a product of the MR ratio and the resistance ratio, ΔR=MR ratio*resistance R, is compared between the elements, a resistance change ratio between the elements is 5.6*3.4/4.2*4=1/1, that is, output ΔR is balanced.

In a more typical case, a half taper is formed according to the following guide. Respective dimensions are defined as shown in FIG. 1. It is represented that mask height (total height of a mask on a magneto-resistive-effect film irrespective of whether the film includes a multilayer or a single layer) is h, track width of the mask is Tw, total thickness of a magneto-resistive-effect film is t, thickness from a substrate side end of the film to a center of a first magnetic detection film is t1, and thickness from the center of the first magnetic detection film to a center of a next magnetic detection film is GL. It is assumed that a ratio between respective MR ratios of the two elements is given as MR1/MR2=a (a subscript 1 shows a substrate side, and a subscript 2 shows a near-top side compared with 1), the ratios being measured in a stage that the magneto-resistive-effect film is deposited. According to experimental results of the inventors, even if the same film is deposited in the two elements, the ratio a is within a range of $4/3 \geq a \geq 1$. A track width ratio required for correcting imbalance in film characteristics with element resistance is $Tw1/Tw2=a$. The reason for this is that the output $\Delta R$ is in a relation of $\Delta R=MR*R_{oc}MR/Tw$ (because stripe height and specific resistance are the same), and therefore an output ratio between the elements is given as $\Delta R1/\Delta R2=(MR1/Tw1)/(MR2/Tw2)=a/a=1$. A track width ratio $Tw1/Tw2=a$ is also within a range of $4/3 \geq a \geq 1$, and therefore the elements are processed such that the lower element has a larger track width.

As an ion milling condition used for forming a half taper shape having such dimensions, ions can be injected at an incident angle θ shown in FIG. 1 to first approximation. This is because a shape is formed after ion milling in such a manner that a skirt of a taper is approximately formed near an intersection of a straight line extended from a shadow end of the mask with the incident angle θ and a film surface. More particularly, the condition is obtained by numerical simulation considering substrate rotation, an inclination angle of a film surface, and decreased thickness of a mask due to milling. However, as a result of comparison between the two types of calculation, any significant difference was not found even if the simple approximation calculation shown herein is used. A formula for obtaining the incident angle θ is expressed as follows:

$$\tan θ=0.5*(a-1)*Tw*(GL+t1)/(GL*(t+h))$$ Equation 3

θ is an ion incident angle defined with respect to a substrate normal direction, and Tw is a track width of the upper element. This is simply obtained from a geometric relation shown in FIG. 1. Assuming that a bottom of a skirt triangle of the half taper is z, the following is given from a similar figure:

$$z/(GL+t1)=0.5*(Tw1-Tw2)/GL$$ Equation 4

When this is substituted into $\tan θ=z/(t+h)$ so that z is eliminated, Equation 3 is given. Approximation of $Tw2=Tw1/a \sim Tw$ was made.

The incident angle θ is typically 40° or less in some approaches, and therefore some re-deposition is inevitable. Therefore, a redeposit removal step with an incident angle of about 70 degrees is added as described before. When ion milling processing is performed at the above condition by total milling amount of $2.(t-t1-GL)$ in thickness on a flat portion, a half taper shape having a desired track width ratio $Tw1/Tw2=a$ can be formed. A certain relation exists between the total milling amount and the half taper shape, and consequently a distance from a top of the magneto-resistive-effect film to the inflection point is approximately equal to ½ of the total milling amount. To intuitively describe the reason for this, while a wafer is rotated by 360 degrees, respective portions shaded and unshaded by the mask are changed with each other at a rate of ½, and therefore a distance to the inflection point directly below the mask, along which a film is removed only in an unshaded case, corresponds to ½ of total milling amount on a flat portion. In more detail, the distance is obtained by numerical simulation considering incident angle dependence of milling amount. However, as a result of comparison between the two types of approximation, any significant difference was not found even if the simple approximation shown herein is used.

Figure 24:
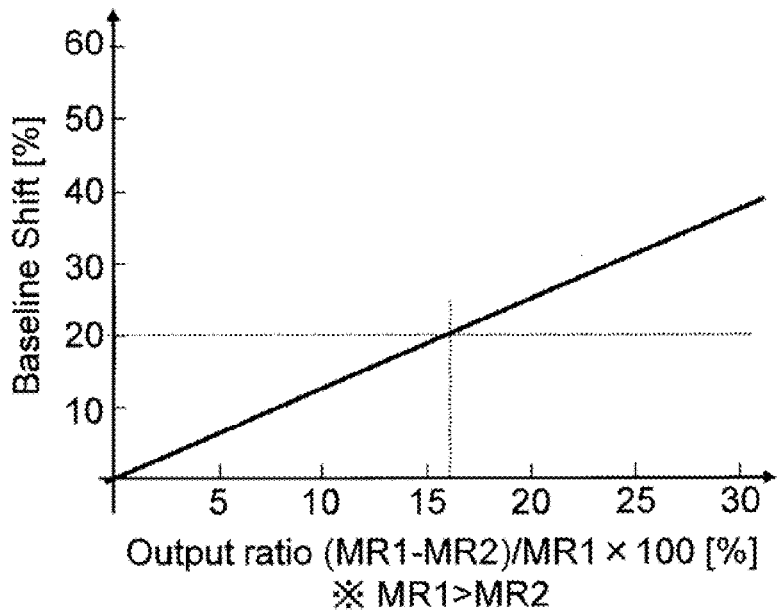
FIG. 24 is an explanatory diagram showing a relationship between baseline shift and output difference between two elements, according to one embodiment.

Next, a more typical guide including an allowable range is shown, according to one embodiment. Mismatch of output $\Delta R$ between the two elements of the differential-type magnetic head causes a baseline shift in output waveform as described before. The baseline shift problematically degrades an error rate of a head. The differential-type magnetic head has an advantage of improving resolution compared with a typical head, and thereby may improve the error rate. It is considered that the allowable range of reduction in error rate due to the baseline shift corresponds to a level below which even if such improvement is cancelled by the relevant degradation, the improvement is still adequately effected in total. From investigation results, allowable degradation in error rate was within 0.6 figures in BER (Bit Error Rate, logarithm notation), and corresponding baseline shift was 20%. A relationship between baseline shift and a difference in output between the two elements is linear as shown in FIG. 24, and therefore a difference in output between the two elements needs to be within 16% to control the baseline shift to be 20% or less. Allowable track width ratio between the two elements $Tw1/Tw2$, which corresponds to the baseline shift value of 20%, is obtained.

Output $\Delta R$ of each element is expressed as shown in Equation 5, where SH is the stripe height and Tw is the track width.

$$\Delta R=MR*R_{oc}MR*1/(SH*Tw)$$ Equation 5

When an MR ratio is the same between the two elements, a difference in output between the two elements $(\Delta R2-\Delta R1)/\Delta R2$, $(\Delta R2>\Delta R1)$ is expressed as shown in Equation 6.

$$(\Delta R2-\Delta R1)/\Delta R2=(1-\Delta R/\Delta R2)=(1-Tw2/Tw1)$$ Equation 6

Figure 25:
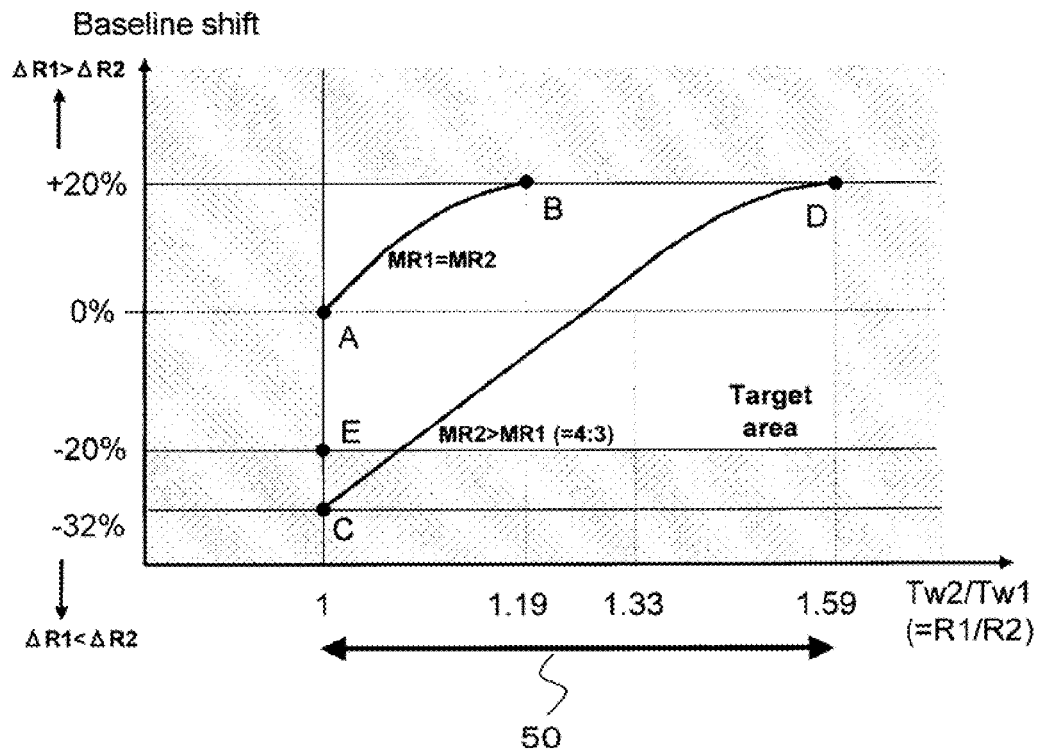
FIG. 25 is an explanatory diagram showing a relationship between a track width ratio and baseline shift, according to one embodiment.

When the output difference is within 16%=0.16, an allowable track width ratio $Tw1/Tw2$ is within 1.19. Respective stripe heights SH are assumed to be the same. This relationship is shown in FIG. 25. In the case that the two elements have the same MR ratio, when the track width $Tw1$ of the lower element forming the half taper is widened, baseline shift increases, and baseline shift reaches 20% being the allowable value at a point B of $Tw1/Tw2=1.19$.

FIG. 25 further provides guidance in an extended case where the two elements have different MR ratios. When the lower element has a larger MR ratio is considered, and when track width of the lower element is widened, output difference is decreased, and baseline shift temporarily tends to be improved. The largest value of a track width ratio before baseline shift reaches the allowable value of 20% is large compared with the case of the same MR ratio. As described before, according to the experimental results, in the respective MR ratios of the upper and lower elements, the MR ratio of the lower element is larger at a rate of about 4/3. While the rate is considered to be the maximum, a difference between the MR ratios tends to be reduced by improving a deposition condition and the like. Therefore, a maximum value of an allowable track width ratio can be considered to be in the case of the MR ratio=4/3. When a ratio between the MR ratios of the two elements is generalized and replaced by $MR1/MR2=a$, a difference in output between the two elements is expressed as $(\Delta R2-\Delta R1)/_{max}(\Delta R1, \Delta R2)$. Therefore, when $\Delta R1 \geq \Delta R2$ is true, $1/a*R2/R1-1$ is given, and when $\Delta R1<\Delta R2$ is true, $1-a*R1/R2$ is given. When a track width ratio $Tw1/Tw2=r$ is used for rearrangement, the following are given:

in the case of $\Delta R1 \geq R2$, difference in output between the two elements=$r/a-1$;

in the case of $\Delta R1<\Delta R2$, difference in output between the two elements=$1-a/r$.

In FIG. 25, the output difference is converted into baseline shift, and plotted in the case of a=4/3 (curve CD). The maximum track width ratio $Tw1/Tw2$ shown at a point D, at which the curve CD intersects with a line of baseline shift of 20%, is 1.59. Consequently, the track width ratio $Tw1/Tw2$ of the half taper shape is made to be 1.59 or less, which is guidance for controlling baseline shift below the allowable value under an actual condition where MR ratios and track widths are different between the two elements respectively.

As in the case of the previously shown Equation 3, an ion incident angle condition of ion milling for achieving the half taper is generalized. From the geometric relationship of FIG. 1, the following is given: $\tan \theta = (Tw1/Tw2-1)/2 \cdot Tw2 \cdot (GL+t1)/(GL \cdot (t+h))$. When the track width ratio Tw1/Tw2 is 1.59 or less, Equation 7 is established.

$$\tan \theta \leq 0.3 \cdot Tw \cdot (GL+t1)/(GL \cdot (t+h)) \quad \text{Equation 7}$$

Since Tw2 is regarded to be approximately equal to the track width Tw of the mask, Tw2~Tw is assumed, and Tw2 is replaced by Tw. Re-deposition may occur on a sidewall depending on ion milling conditions, and Tw2 tends to be somewhat wider than Tw. However, this conclusion is not affected thereby. In addition, the following two equations represent conditions that are to be used:

$$\text{total milling amount (in thickness on flat portion)} \geq 2 \cdot (t-t1-GL) \quad \text{Equation 8}$$

$$\text{total milling amount (in thickness on flat portion)} \leq 2 \cdot t \quad \text{Equation 9}$$

When Equation 8 is satisfied, an inflection point on a track sidewall is located on or below the upper free layer. When Equation 9 is satisfied, the inflection point is located on and above a lower end of a stacked structure of the differential-type magneto-resistive-effect film. In order to form a desired half taper, formation steps of the half taper may include an ion milling step according to at least the conditions of the Equations 7, 8, 9.

Figure 26:
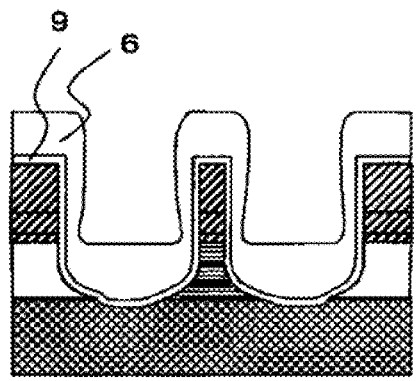
FIG. 26 is an explanatory view schematically showing the manufacturing process flow of the first example continued from FIG. 23, according to one embodiment.
Figure 27:
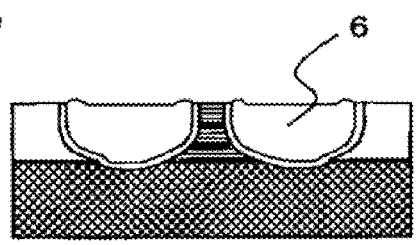
FIG. 27 is an explanatory view schematically showing the manufacturing process flow of the first example continued from FIG. 26, according to one embodiment.
Figure 36:
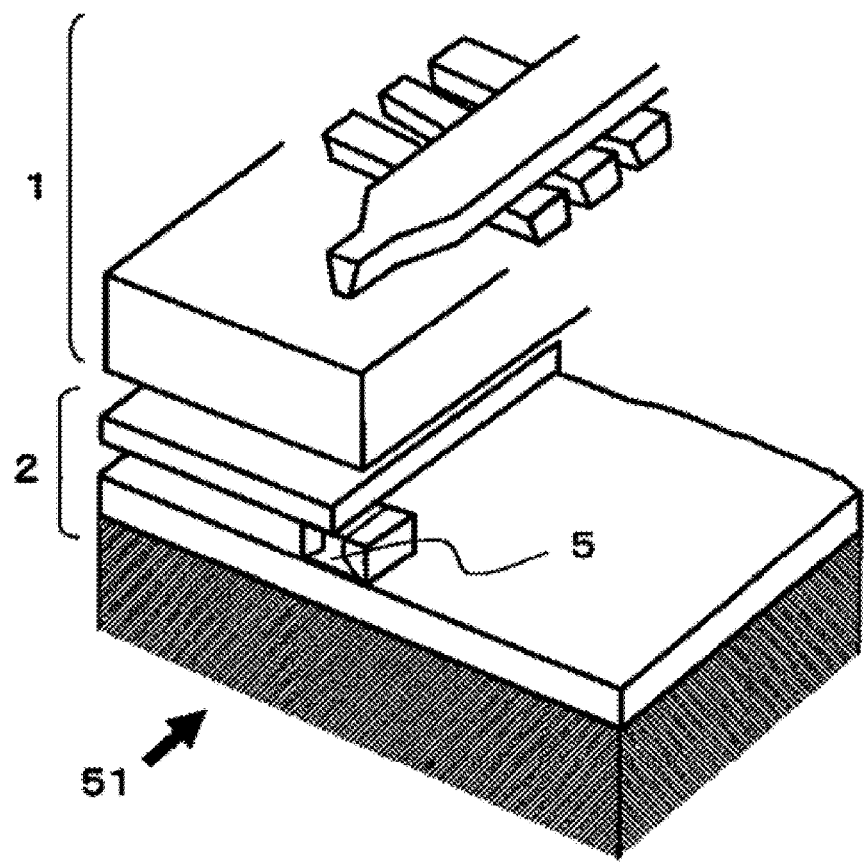
FIG. 36 is a schematic view of a completed magnetic head in the first example, according to one embodiment.

After that, the same manufacturing steps as those of a typical magnetic head may be performed, according to some embodiments. A thin alumina film 9, used as an insulating film on a sidewall of a magneto-resistive-effect film being exposed by ion milling, and a hard bias film 6 are deposited, leading to a structure as shown in FIG. 26. An alloy film, including cobalt-chromium-platinum, is used for the hard bias film. A stacked resist layer, an insulating film, and a hard bias film on the magneto-resistive-effect film are removed by CMP liftoff, leading to a structure as shown in FIG. 27, and consequently a basic structure of a read sensor is completed. While subsequent drawings and description are omitted, permalloy may be deposited as an electrode combined with an upper magnetic shield layer, then a step where a write head may be directly formed above the read head is performed, thereby a magnetic head is completed. FIG. 36 shows a completed magnetic head.

Next, a second example is described. In the example, a method of forming a half taper by processing the stripe height (SH) is described. The method is the same as in the first example in and before formation of a mask for a stripe height pattern as shown in FIG. 19. In detail, a three-layer-configuration mask of photoresist/polyimide/DLC (diamond-like carbon film) is used as the photoresist 30. A pattern is formed in the photoresist by lithography, and the pattern is transferred to the polyimide/DLC by RIE using the photoresist as a mask. Then, a stripe height pattern is transferred to the magneto-resistive-effect film by ion milling using the mask 30. In the example, ion milling for forming a half taper is performed in this stage by using the same method as in track width formation in the first example. Here, milling was performed at an angle of 20° using a mask having a height of 60 nm. Moreover, a milling step was added by a certain amount of milling at an injection angle of 70°, or approximately laterally, for a time of 30% to 100% of a time of a previous step in order to remove redeposit. Since the differential-type magneto-resistive-effect film is a thick film, three sets of milling were performed in sets of milling at 20° and milling at 70°, that is, multistep milling of six steps in total was performed. Total amount of milling was 80 nm, with 78 nm being the magneto-resistive-effect film and 2 nm being over-milling on a flat portion.

Figure 28:
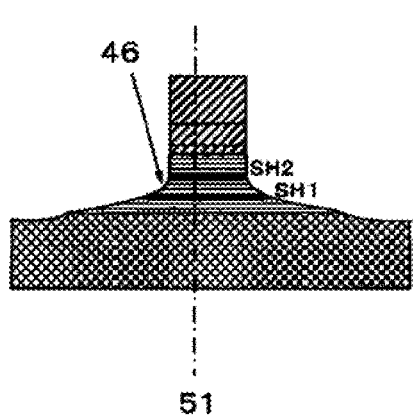
FIG. 28 is an explanatory view showing a stripe height section after ion milling in a manufacturing process flow in a second example, according to one embodiment.
Figure 29:
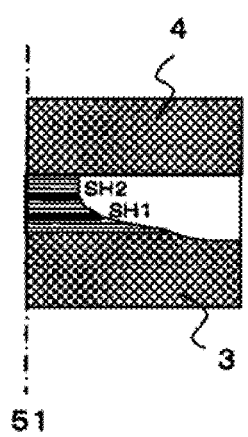
FIG. 29 is an explanatory view showing a final shape of the section along a stripe height after ion milling in the second example, according to one embodiment.

FIG. 28 shows a section of stripe height after milling. The section shows a surface perpendicular to an ABS surface 51 (surface to be processed), showing a different surface by 90° from the relevant surfaces in other figures. A sidewall of stripe height is shaped to have an inflection point 46 and a half taper shape is formed, in which stripe height SH1 of a lower element extends by +20 nm with respect to stripe height SH2 of an upper element. After that, the ABS surface is finally subjected to lapping in a slider processing step of a magnetic head, and removed until the stripe height SH2 reaches 60 nm. FIG. 29 shows a final shape of the half taper, according to one embodiment. A half taper shape was able to be formed, in which a ratio between upper and lower stripe heights is given as SH1/SH2=4/3.

The stripe heights are differently formed at a rate of 4/3, thereby a resistance ratio between the elements is 3/4 being an inverse ratio to this. The same magneto-resistive-effect film as in the first example is used. Therefore, noting the film characteristic, MR ratios of the upper and lower elements are not balanced and in a rate of 5.6/4.2. However, when resistance change as a product of the MR ratio and the resistance ratio, $\Delta R = $ MR ratio resistance R, is compared between the elements, a resistance change ratio between the elements is 1/1, that is, output $\Delta R$ is balanced. A position of the inflection point 46 is preferably located between the respective free layers that dominate characteristics of the upper and lower elements. At that time, while a desired difference is provided between stripe heights of the upper and lower elements, some of the upper mask width is secured so that processing is facilitated.

Figure 30:
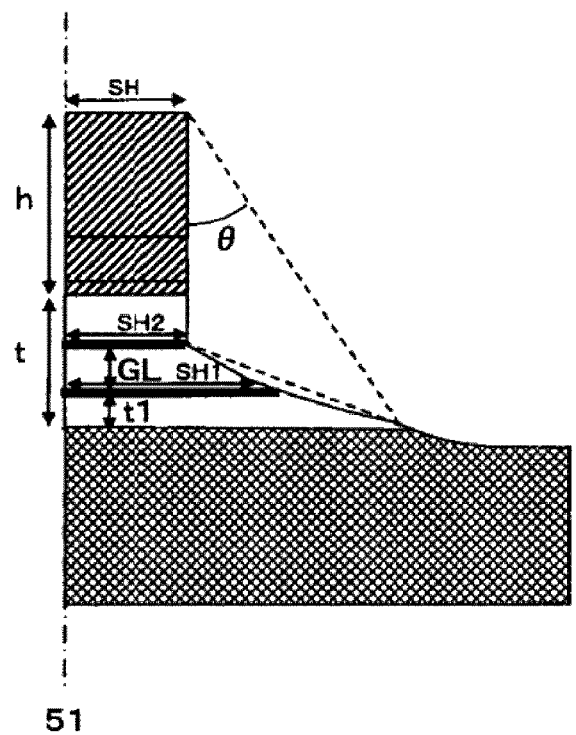
FIG. 30 is an explanatory view schematically showing dimensions of portions in the second example, according to one embodiment.

In processing of stripe height, a method of forming a half taper is performed according to some embodiments. Dimensions of respective portions are defined as shown in FIG. 30. The discussion from which the general formula is derived in the first example is used again, and stripe height is substituted for track width. From a geometric relation in FIG. 30, an ion incident angle condition of ion milling for achieving the half taper is as shown in Equation 10.

$$\tan \theta = (SH1/SH2-1) \cdot SH2 \cdot (GL+t1)/(GL \cdot (t+h)) \quad \text{Equation 10}$$

Since the ABS surface is a vertical surface unlike the situation found in the track width example, the above condition is different by two factors from the situation found in the track width example. From the same discussion as in the first example, under a condition that two parameters of MR ratios and stripe heights are different between the two elements respectively, a ratio of stripe height SH1/SH2≤1.59 is obtained as a guide for controlling baseline shift to be below an allowable value, and consequently Equation 11 is given.

$$\tan \theta = 0.6 \cdot SH \cdot (GL+t1)/(GL \cdot (t+h)) \quad \text{Equation 11}$$

Since SH2 is regarded to be approximately equal to stripe height SH of a mask, SH2~SH is assumed, and SH2 is replaced by SH. Re-deposition may occur on a sidewall depending on an ion milling condition, and SH2 tends to be somewhat wider than SH. However, the result is not affected thereby. In addition, the following conditions are used according to the same reasons as in the case of track width.

total milling amount (in thickness on flat portion)≧2*(t−t1−GL)  Equation 12 total milling amount (in thickness on flat portion)≦2*t  Equation 13

In order to form a desired half taper, formation steps of the half taper may include an ion milling step according to at least the conditions of Equations 11, 12, 13.

The method, according to one approach, which achieves the half taper in processing of a stripe height, may respond to an ultimate narrow track width in correspondence to higher recording density. For example, in a dimension area where a lower-side track width being wider is given as Tw1=30 nm or less, since a dimension of upper-side track width is too small, half taper processing is difficult. On the other hand, according to one approach, since half taper processing is performed on the stripe height side, upper and lower track widths can be made to have approximately the same size, that is, Tw1~Tw2 can be established.

Next, description a third example is made of a method where characteristics of upper and lower magneto-resistance-effect films are approximately the same, while upper and lower track widths are made to be approximately the same, that is, Tw1~Tw2 is established, a half taper is formed in a track width portion of Tw1 or less, so that degradation by processing is prevented. The method is the same as in the first example before formation of a mask for a track width pattern as shown in FIG. 10. However, a different film from the film in the first example is used for a magneto-resistive-effect film, and each of magneto-resistance ratios (MR ratios) of the upper and lower elements, which were measured after deposition, was 5%. This is because while an essential spin valve structure is not changed, crystallinity is different depending on a structure of the nonmagnetic intermediate layer between the upper and lower elements, creating a condition at which the magneto-resistance ratios are approximately equalized. In this case, it is not necessary to vary section area of each of the upper and lower elements by forming a half taper to adjust resistance. However, the half taper is formed to prevent degradation of characteristics due to ion milling processing.

In the condition of FIG. 10, a mask pattern having a track width Tw=60 nm is formed, and a mask stacked film 30 includes a three-layer structure of photoresist/polyimide/DLC (diamond-like carbon film) from a top. The three-layer mask has passed through a stage of patterning by exposing only the photoresist, and a stage of transferring the pattern to the polyimide/DLC being an underlayer by using RIE with the patterned photoresist as a mask. At that time, respective exposure, development, and RIE conditions are selected such that a sidewall of the three-layer mask pattern rises vertically. Next, a track pattern is transferred to a magneto-resistive-effect film 14 by ion milling using the mask stacked film 30 in such a condition as a mask.

Figure 31:
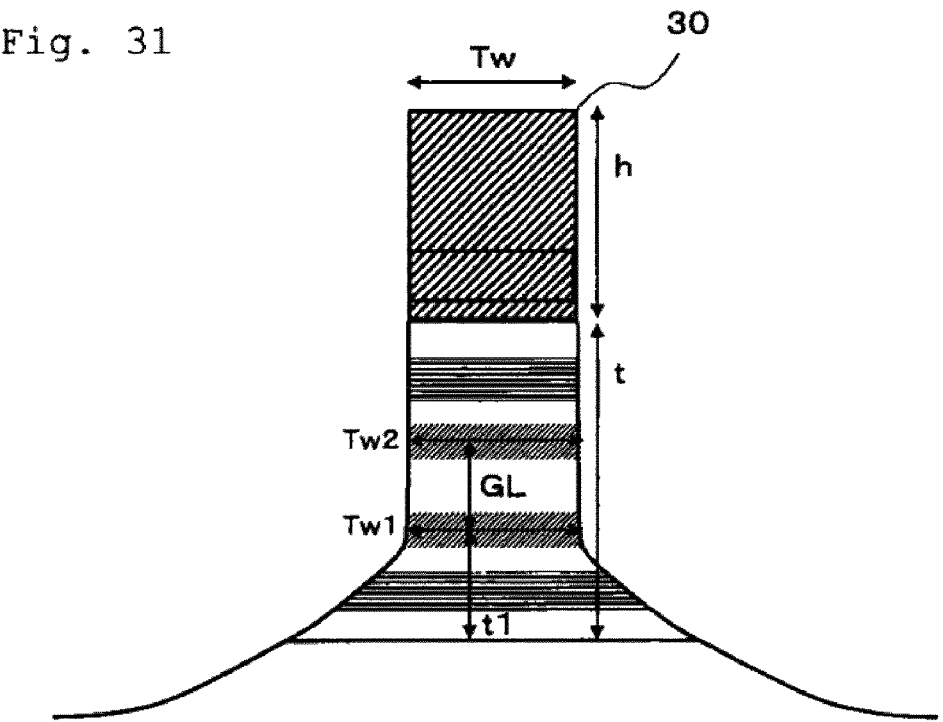
FIG. 31 is an explanatory view schematically showing a track width section after ion milling in a third example, according to one embodiment.

FIG. 31 shows a section after ion milling. In the example, ion milling processing was performed so as to form a half taper shape in which track widths of the upper and lower elements were approximately the same, that is, Tw1~Tw2 was established. This was enabled by selecting an appropriate ion milling condition such that a taper is formed in a portion of a lower element having a track width of Tw1 or less. Specifically, an ion milling step of a magneto-resistive-effect film having a total thickness of about 78 nm was performed by about 115 nm in total in three steps of: (1) processing by about 55 nm (in thickness on a flat portion, the same is true below) to a depth of Tw1 of the lower element at about 50° incidence, (2) additional processing by about 45 nm at about 40° incidence, and (3) over-etching by about 15 nm at about 30° incidence. Ion milling is performed using stepwise oblique incidence at about 50° to about 30°, which prevents degradation of characteristics due to formation of shunt to a spin-valve intermediate-layer portion caused by conductive redeposit. In addition, a mask having a vertical sidewall and appropriate processing amount of ion milling are selected, thereby the upper and lower elements are formed to have approximately the same track width.

In more generalized guidance, in order to perform ion milling processing to form a half taper shape in which the upper and lower elements have approximately the same track width, that is, Tw1~Tw2 is established, it is enough that a mask having a vertical sidewall is used, and ion milling is performed so that when t is a total thickness of a differential-type magneto-resistive-effect film, and t1 is a thickness from a substrate side end of the film to a center of a magnetic detection film of the lower element, total ion milling amount is at least 2*(t−t1) in milling thickness on a flat portion as a reference. In this case, a half taper shape, in which the upper and lower elements have approximately the same track width, can be formed without depending on an incident angle of ion milling. Strictly speaking, respective track widths of the upper and lower elements vary due to increases in width by re-deposition, or decrease in width due to milling in a near horizontal direction depending on an incident angle of ion milling. However, in some approaches, the track widths are substantially determined by the above conditions. In the above example, since t=78 nm and t1=23 nm are established, ion milling can be performed by 2*(t−t1)=110 nm or more, and is performed by about 115 nm in total. Moreover, an upper limit of the total ion milling amount is 2*t. In this case, an inflection point is located above a lower end of the differential-type magneto-resistive-effect film.

As shown in the example, an incident angle of ion milling is desirably larger than about 40°, for example, an angle of about 50° to about 40° is mainly used as the incident angle so that re-deposition hardly occurs on a sidewall, thereby degradation of characteristics and variation in track width are suppressed in both the upper and lower elements. In the example, an angle is increasingly raised for each step, and particularly in the later step, the incident angle of about 30°, which is slightly acute compared with the angle according to the guidance, is used. The reason for this is that an angle is optimized corresponding to a taper that is formed near a track along with proceeding of processing, so that an incident angle to a film plane is substantially changed. The angle is increasingly raised in a later step, thereby while re-deposition is suppressed, reduction in track width due to laterally incident ions can be prevented, and a skirt portion of a taper can be reduced.

Now, a fourth example is described. The example is a modification of the third example, and description is made of a method of forming a half taper while upper and lower stripe heights are made approximately equal, that is, SH1~SH2 is established, by ion milling processing on a stripe height side. Hereinafter, only different procedures are described. The method is the same as in the first or second example before an ion milling step of a stripe height pattern as shown in FIG. 19. After that, the stripe height pattern is transferred to a magneto-resistive-effect film 14 by ion milling using a three-layer stacked mask of photoresist/polyimide/DLC as in the third example.

Figure 32:
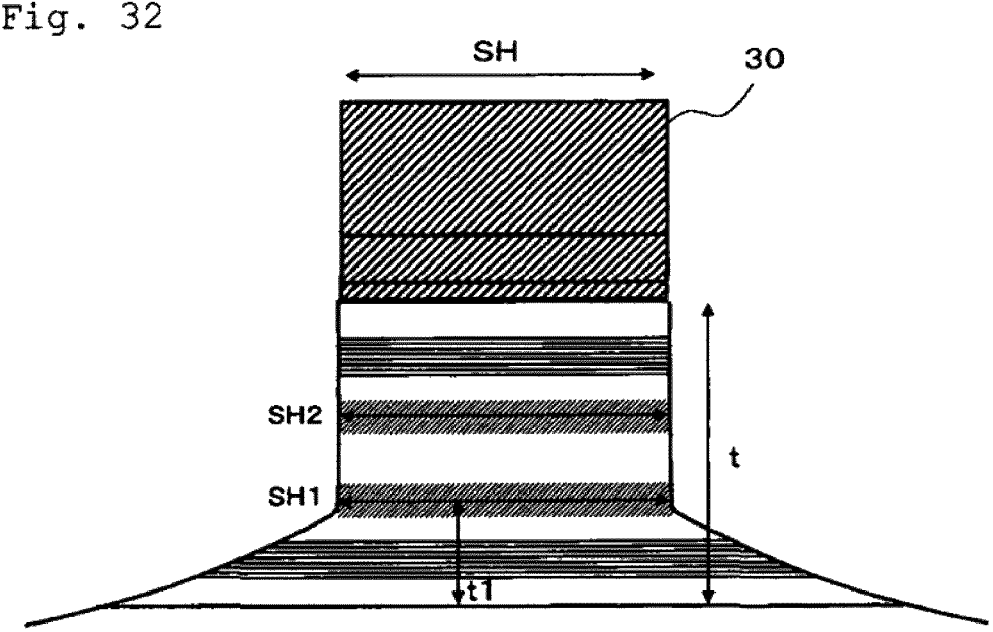
FIG. 32 is an explanatory view schematically showing a stripe height section after ion milling in a fourth example, according to one embodiment.

FIG. 32 shows a section after ion milling. Ion milling processing was performed so as to form a half taper shape in which stripe height of the upper and lower elements were approximately the same, that is, SH1~SH2 was established. Specifically, an ion milling step of a magneto-resistive-effect film having a total thickness of about 78 nm was performed by about 120 nm in total by three sets of ion milling. The sets include: (1) processing by about 25 nm (in thickness on a flat portion, the same is true below) at about 25° incidence, and (2) processing by about 15 nm at about 70° incidence, that is, performed by six steps in total. Ion milling at about 25° incidence, which is a slightly acute angle, provides an effect of preventing too large expansion of a taper, so that increase in difference in level can be prevented after an insulating film is subsequently filled. On the other hand, since re-deposition tends to occur, a redeposit removal step at about 70° incidence is added to prevent degradation of characteristics.

In the example, guidance is generalized in the same way as in the third example. That is, ion milling can be performed so that when it is represented that the total thickness is t, and thickness from a substrate side end to a center of a magnetic detection film of the lower element is t1, total ion milling amount is at least 2*(t−t1) in milling thickness on a flat portion as a reference. In this case, a half taper shape, in which the upper and lower elements had approximately the same stripe height, can be formed without depending on an incident angle of ion milling. Moreover, an upper limit of total ion milling amount is 2*t. According to the method of the example, stripe heights of the upper and lower elements are equalized, thereby while a difference in characteristics is cancelled during differential operation, degradation of characteristics can be suppressed during ion milling.

Figure 33:
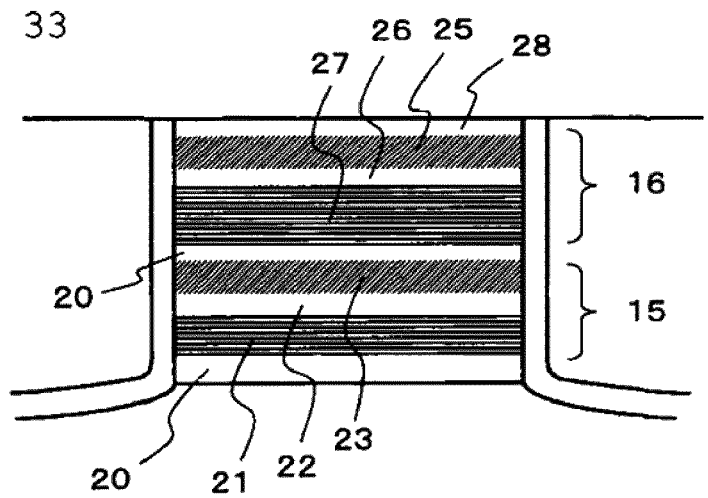
FIG. 33 is an explanatory view showing a configuration of a magneto-resistive-effect film in a fifth example, according to one embodiment.

Now, a fifth example is described. The example is a modification of the first example, and is different from the first example in configuration of a differential-type magneto-resistive-effect film. FIG. 33 shows a configuration of the magneto-resistive-effect film. The configuration is not different in the structure of the two spin valves being stacked, but the configuration has a direct stacked structure of spin valve/spin valve, in which a stacked order of one spin valve is not inverted to the other. To describe the magneto-resistive-effect film as a whole in order from a top for each of functions including a detailed configuration of the spin valve, cap layer 28/free layer 25/insulating layer 26/pinned layer 27/underlying layer 20/free layer 23/insulating layer 22/pinned layer 21/underlying layer 20 is given. A differential layer structure of layer the spin-valve-directly-stacked type is advantageous in that the nonmagnetic intermediate layer is omitted according to some approaches, so that total thickness can be reduced, and since a previous single-layer spin valve can be used without reversing a stacking order of the upper spin valve, characteristics of upper and lower elements are easily equalized, and therefore technology development is facilitated. While gap length of the differential structure is determined by thickness of each pinned layer, the gap length can be set within an appropriate range of about 18 to 24 nm. The configuration is not different from the case of the first example in that a magnetization pinning direction of the upper element needs to be reversed to a magnetization pinning direction of the lower element for differential operation, and therefore number of exchange coupling layers is configured to be different in parity between the pinned layers of the upper and lower elements. Here, the number of exchange coupling layers is three in the upper element, and two in the lower element. A TMR element having a large magneto-resistance ratio (MR ratio) is used for the spin valve. A nonmagnetic conductive layer may be used in place of each of the insulating layers 22 and 26.

Figure 34:
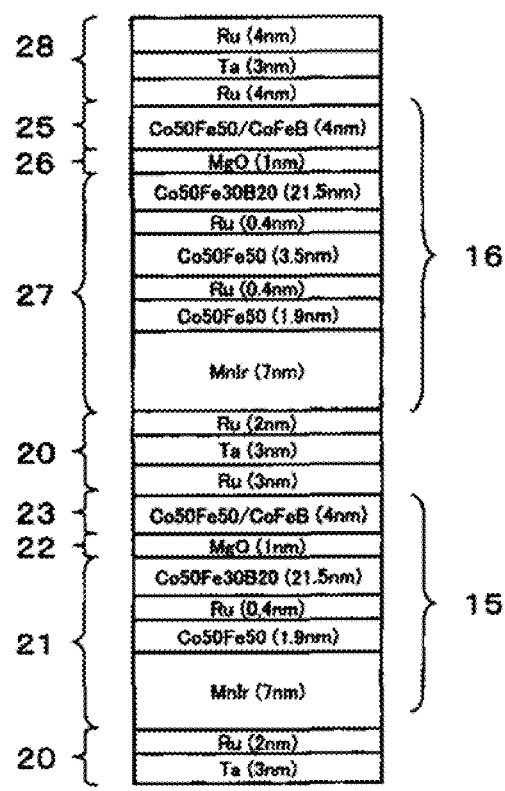
FIG. 34 is an explanatory view showing details of the magneto-resistive-effect film in the fifth example, according to one embodiment.

FIG. 34 shows details of a film configuration. A lower element 15 is formed on the underlying layer 20, an upper element 16 is formed thereon via the underlying layer 20, and the cap layer 28 is formed thereon. The lower element 15 includes the pinned layer 21, the insulating layer 22, and the free layer 23. The upper element 16 includes the pinned layer 27, the insulating layer 26, and the free layer 25, which are stacked on the underlying layer 20. Total thickness of the magneto-resistive-effect film is about 60 nm, which is reduced by about 20% compared with that in the first example. Thus, reduction in time of an ion milling step, reduction in risk of degradation of characteristics, and improvement in liftoff performance are expected. Moreover, either of the upper and lower elements has a magneto-resistance ratio of about 70%, which was measured after deposition, and characteristics are equalized. In addition, the TMR element is large in output, easily significantly changed in MR ratio by adjusting the thickness of MgO as an insulating layer, leading to an advantage in that MR ratios of the upper and lower elements are easily equalized during deposition.

On the other hand, since the TMR element is structured to have an insulating film being interposed, conductive redeposit produced during ion milling tends to be a parallel resistance, and therefore the TMR element is extremely sensitive to shunt failure. As a measure for this, an exposed side face is changed into an insulator by forced oxidation using ozone treatment after ion milling, in some approaches. A process is the same as in the third example as shown in FIG. 31 in and before a stage where an ion milling step of track width is finished. Respective track widths are equalized so that characteristics of the upper and lower elements are equalized, and a half taper is formed in a portion of the lower element having a track width of Tw1 or less in order to prevent shunting. While re-deposition is suppressed by forming the half taper, in the case of the differential type, an end face of the upper element, which is first exposed during processing, is particularly subjected to long ion milling and therefore tends to have redeposit thereon. Therefore, in the case that the TMR element sensitive to shunting is used, an end face is forcibly oxidized by ozone oxidation after ion milling.

Figure 35:
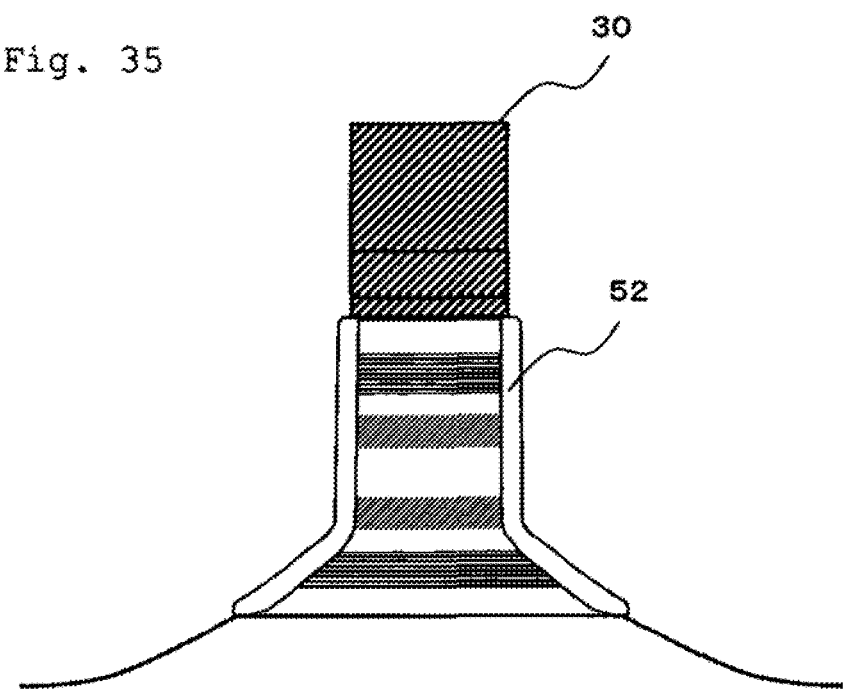
FIG. 35 is an explanatory view schematically showing a section after forced oxidation in the fifth example, according to one embodiment.

FIG. 35 shows a condition after ozone oxidation. An oxide 52 is formed on a side face to prevent shunting. Oxidation is performed to at least a degree at which the insulating layer portion of the upper element being thickened by re-deposition is completely oxidized. A typical oxidation degree is about 0.5 to 5 nm. After that, the process passes through the same steps as in the first example. While not described here, forced oxidation is similarly performed by ozone treatment even in a formation step of stripe height, so that shunting failure is prevented. Other steps are the same as those in the first example and therefore omitted. Moreover, in the case that forced oxidation of a sidewall is performed like in the example, a sufficiently small amount of redeposit to be oxidized is allowable. Therefore, a sidewall is not limitedly shaped into a half taper, and a sidewall as a whole may be processed vertically by ion milling.

In the above examples, description has been made on a case that the, stripe height pattern is first formed as an order of formation steps of the, stripe height pattern and the track width pattern. However, the order of the formation steps can be reversed. Even in the case that the track width pattern is first formed, the invention may be directly applied, and advantages of the invention are not changed.

The invention can be applied to manufacturing of a high-resolution magnetic sensor using a magneto-resistive-effect element; in particular, manufacturing of a magnetic read head for a magnetic disk.

It should be noted that methodology presented herein for at least some of the various embodiments may be implemented, in whole or in part, in computer hardware, software, by hand, using specialty equipment, etc., and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A differential-type magnetic read head, comprising:
    a differential-type magneto-resistive-effect film formed on a substrate; and
    a pair of electrodes for applying current to the differential-type magneto-resistive-effect film in a direction perpendicular to a film plane of the film,
    wherein the differential-type magneto-resistive-effect film includes a first stacked film having:
        a first pinned layer;
        a first intermediate layer; and
        a first free layer; and
    wherein the differential-type magneto-resistive-effect film includes a second stacked film formed on the first stacked film, the second stacked film having:
        a second pinned layer;
        a second intermediate layer; and
        a second free layer; and
    wherein a side face in a track width direction of the differential-type magneto-resistive-effect film is shaped to have an inflection point at an intermediate position in a thickness direction of the differential-type magneto-resistive-effect film,
    wherein the inflection point is located between the first free layer and the second free layer,
    wherein the side face is shaped to be approximately vertical to the substrate in an upward direction of the substrate from the inflection point, and
    wherein the side face is shaped to be gradually increased in track width as approaching the substrate in a downward direction of the substrate from the inflection point.

2. The differential-type magnetic read head according to claim 1, wherein Tw1/Tw2 is within a range of about 1.0 to about 1.59, wherein Tw1 is the track width of the first free layer, and Tw2 is the track width of the second free layer.

3. The differential-type magnetic read head according to claim 1, wherein track width of the first free layer is about 100 nm or less.

4. The differential-type magnetic read head according to claim 1:
    wherein the first stacked film is stacked in order of the first pinned layer, the first intermediate layer,
    wherein the first free layer from a substrate side, and the second stacked film is stacked in order of the second free layer, the second intermediate layer, and the second pinned layer from the substrate side, and
    wherein a nonmagnetic intermediate layer is formed between the first free layer and the second free layer.

5. The differential-type magnetic read head according to claim 1, wherein a stacked order of the first pinned layer, the first intermediate layer, and the first free layer of the first stacked film is the same as a stacked order of the second pinned layer, the second intermediate layer, and the second free layer of the second stacked film.

6. The differential-type magnetic read head according to claim 1, wherein each of the first intermediate layer and the second intermediate layer is an insulating layer.

7. A method of manufacturing the differential-type magnetic read head as recited in claim 1, the method comprising:
    forming the lower magnetic shield;
    forming the differential-type magneto-resistive-effect film on the lower magnetic shield,
    forming the pair of electrodes for applying current to the differential-type magneto-resistive-effect film in the direction perpendicular to the film plane of the film;
    forming a mask pattern having a track width Tw, a height h, and side faces shaped to be approximately vertical on the differential-type magneto-resistive-effect film; and
    ion milling the differential-type magneto-resistive-effect film using the mask pattern,
    wherein a total amount of the ion milling is at least $2*(t-t1-GL)$ and no greater than $2*t$ in milling thickness on a flat portion as a reference, wherein t is a total thickness of the differential-type magneto-resistive-effect film, t1 is a thickness from a substrate side end of the differential-type magneto-resistive-effect film to a center of the first free layer, GL is a thickness from the center of the first free layer to a center of the second free layer, and θ is an ion incident angle which is defined with respect to a substrate normal direction as $\tan\theta \leq 0.3*Tw*(GL+t1)/(GL*(t+h))$.

8. A method of manufacturing the differential-type magnetic read head as recited in claim 1, the method comprising:
    forming the lower magnetic shield;
    forming the stacked film on the lower magnetic shield;
    forming a mask pattern on the differential-type magneto-resistive-effect film; and
    ion milling to form a side face defining track width of the differential-type magneto-resistive-effect film using the mask pattern,
    wherein a total amount of ion milling is at least $2*(t-t1)$ and no greater than $2*t$ in milling thickness on a flat portion as a reference, wherein t is a total thickness of the differential-type magneto-resistive-effect film, and t1 is a thickness from a substrate side end of the differential-type magneto-resistive-effect film to a center of a first magnetic detection film.

9. The method of manufacturing a differential-type magnetic read head according to claim 8, wherein a mask having an approximately vertical sidewall is used as a mask in the ion milling step.

10. The method of manufacturing a differential-type magnetic read head according to claim 8, wherein a track width at a center of each of the magnetic detection films is about 100 nm or less.

11. A method of manufacturing the differential-type magnetic read head as recited in claim 1, the method comprising:
    forming the lower magnetic shield;
    forming the differential-type magneto-resistive-effect film on the lower magnetic shield;
    forming a mask pattern on the differential-type magneto-resistive-effect film;
    ion milling to form a side face defining track width or stripe height of the differential-type magneto-resistive-effect film using the mask pattern; and
    oxidizing the processed side face after the ion milling.

12. The method of manufacturing the differential-type magnetic read head according to claim 11, wherein a track width of the first free layer is about 100 nm or less.

13. A differential-type magnetic read head, comprising:
a differential-type magneto-resistive-effect film formed on a substrate; and
a pair of electrodes for applying current to the differential-type magneto-resistive-effect film in a direction perpendicular to a film plane of the film,
wherein the differential-type magneto-resistive-effect film includes a first stacked film having:
a first pinned layer;
a first intermediate layer; and
a first free layer; and
wherein the differential-type magneto-resistive-effect film includes a second stacked film formed on the first stacked film having:
a second pinned layer,
a second intermediate layer, and
a second free layer; and
wherein a side face defining stripe height of the differential-type magneto-resistive-effect film is shaped to have an inflection point at an intermediate position in a thickness direction of the differential-type magneto-resistive-effect film,
wherein the inflection point is located between the first free layer and the second free layer,
wherein the side face is shaped to be approximately vertical to the substrate in an upward direction of the substrate from the inflection point, and
wherein the side face is shaped to be gradually increased in stripe height as approaching the substrate in a downward direction of the substrate from the inflection point.

* * * * *

UNITED STATES PATENT AND TRADEMARK OFFICE
CERTIFICATE OF CORRECTION

PATENT NO. : 8,223,464 B2
APPLICATION NO. : 12/615221
DATED : July 17, 2012
INVENTOR(S) : Yasui et al.

Page 1 of 1

It is certified that error appears in the above-identified patent and that said Letters Patent is hereby corrected as shown below:

In the specification:

col. 16, line 27 in Equation (6) replace "$\Delta R/\Delta R2$" with --$\Delta R1/\Delta R2$--.

In the claims:

col. 23, line 38 replace "laver," with --layer,--.

Signed and Sealed this
Eighteenth Day of September, 2012

David J. Kappos
*Director of the United States Patent and Trademark Office*